US007382281B2

(12) United States Patent
Kavaler

(10) Patent No.: US 7,382,281 B2
(45) Date of Patent: *Jun. 3, 2008

(54) METHOD AND APPARATUS REPORTING A VEHICULAR SENSOR WAVEFORM IN A WIRELESS VEHICULAR SENSOR NETWORK

(75) Inventor: Robert Kavaler, Kensington, CA (US)

(73) Assignee: Sensys Networks, Inc., Berkeley, CA (US)

( * ) Notice: Subject to any disclaimer, the term of this patent is extended or adjusted under 35 U.S.C. 154(b) by 196 days.

This patent is subject to a terminal disclaimer.

(21) Appl. No.: 11/315,025

(22) Filed: Dec. 20, 2005

(65) Prior Publication Data

US 2006/0097894 A1 May 11, 2006

Related U.S. Application Data

(63) Continuation-in-part of application No. 11/062,130, filed on Feb. 19, 2005.

(60) Provisional application No. 60/695,742, filed on Jun. 29, 2005, provisional application No. 60/630,366, filed on Nov. 22, 2004, provisional application No. 60/549,260, filed on Mar. 1, 2004.

(51) Int. Cl.
*G08G 1/01* (2006.01)
*B60Q 1/00* (2006.01)

(52) U.S. Cl. ....................... 340/941; 340/933; 340/928

(58) Field of Classification Search ................. 340/941
See application file for complete search history.

(56) References Cited

U.S. PATENT DOCUMENTS

| | | | | |
|---|---|---|---|---|
| 5,491,475 | A | 2/1996 | Rouse et al. | |
| 5,748,108 | A | 5/1998 | Sampey et al. | |
| 5,877,705 | A | 3/1999 | Sampey | |
| 5,880,682 | A | 3/1999 | Soiuilliard et al. | |
| 6,016,109 | A * | 1/2000 | Yosida et al. | 340/941 |
| 6,208,268 | B1 | 3/2001 | Scarzello et al. | |
| 6,662,099 | B2 | 12/2003 | Knaian et al. | |
| 2002/0145541 | A1 * | 10/2002 | Matsui et al. | 340/934 |
| 2002/0177942 | A1 | 11/2002 | Knaian et al. | |

OTHER PUBLICATIONS

Honeywell, "1, 2, and 3 Axis Magnetic Sensors", Honeywell product datasheet, versions available at least 2004, pp. 1-12.
M. Caruso etal, "Vehicle detection & Compass Applications using AMR Magnetic Sensors", Honeywell, since 2004, pp. 1-13.
B. Pant etal, "Magnetic Sensor Cross-Axis Effect", Honeywell App Note AN-205, since 2004, pp. 1-6.
Honeywell, "Vehicle detection using AMR sensors" Honeywell App Note AN-218, since 2004, pp. 1-10.
D.E. Culler etal, "Wireless Sensor Networks: Introduction" Comm. of A.C.M., Jun. 2004, pp. 30-33.
R. Szewczyk etal, "Habitat monitoring with Sensor Networks", Comm. of A.C.M., Jun. 2004, pp. 34-40.
J. Hill, "The platforms enabling wireless sensor networks", Comm. of A.C.M., Jun. 2004, pp. 41-46.
A. Woo etal, "Netowkring support for query processing in sensor networks", Comm. of A.C.M., Jun. 2004, pp. 47-52.
A. Perrig etal, "Security in wireless sensor networks", Comm. of A.C.M., Jun. 2004, pp. 53-57.

* cited by examiner

*Primary Examiner*—Donnie L Crosland
(74) *Attorney, Agent, or Firm*—Earle Jennings

(57) ABSTRACT

The invention includes using multiple wireless vehicular sensor nodes to wirelessly receive multiple, time-interleaved vehicular waveform reports from the nodes. Each vehicular waveform report approximates a raw vehicular sensor waveform observed by a magnetic sensor at the node based upon the presence of a vehicle. The vehicular waveform reports are products of this wirelessly receiving process. The invention includes apparatus supporting the above outlined process. The vehicular waveform reports may be time synchronized.

32 Claims, 23 Drawing Sheets

Fig. 9A
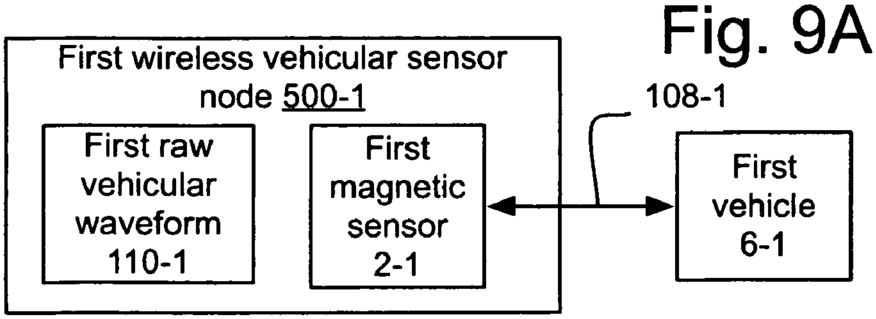
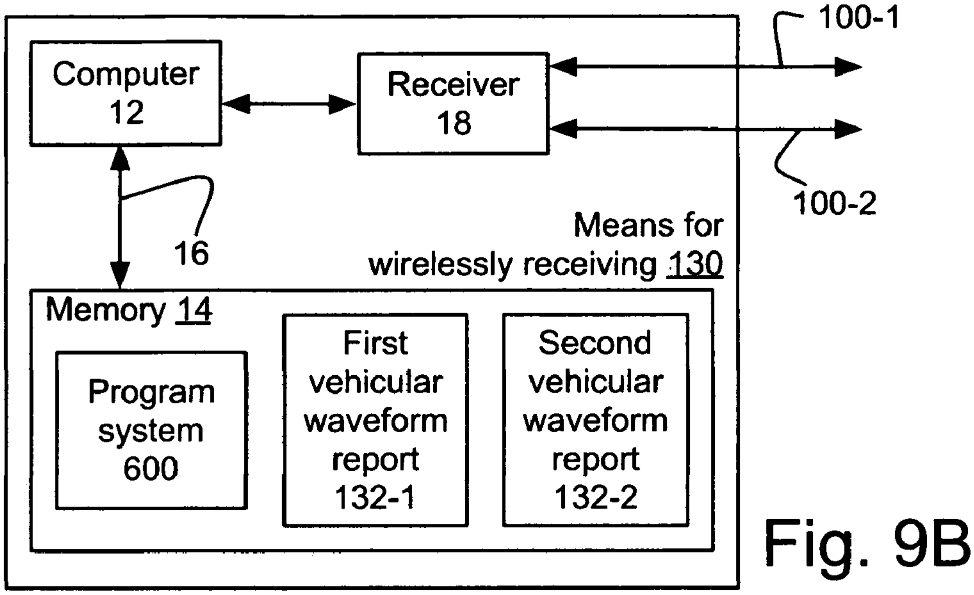
Fig. 9B
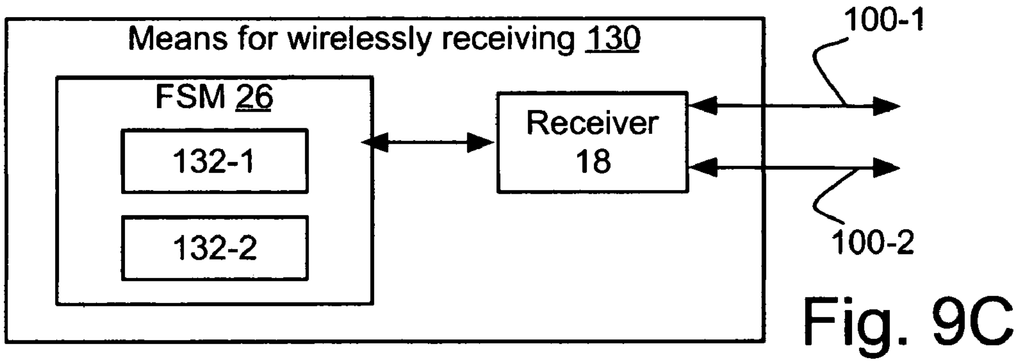
Fig. 9C
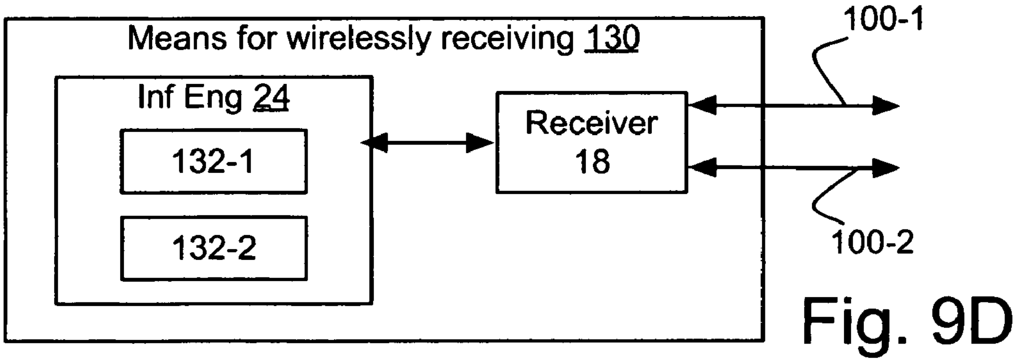
Fig. 9D

METHOD AND APPARATUS REPORTING A VEHICULAR SENSOR WAVEFORM IN A WIRELESS VEHICULAR SENSOR NETWORK

CROSS REFERENCES TO RELATED PATENT APPLICATIONS

This application claims priority to Provisional Patent Application No. 60/695,742, filed on Jun. 29, 2005, and is also a continuation in part of patent application Ser. No. 11/062,130, filed Feb. 19, 2005, which claims priority to Provisional Patent Application Ser. No. 60/549,260, filed Mar. 1, 2004 and Provisional Patent Application Ser. No. 60/630,366, filed Nov. 22, 2004, all of which are incorporated herein by reference.

TECHNICAL FIELD

This invention relates to wireless vehicular sensor networks, in particular, to the reporting of the waveforms approximating the raw sensor readings due to the presence of motor vehicles.

BACKGROUND OF THE INVENTION

Today, there are numerous situations in which confirming the type of vehicle passing over a spot on the road is important. While visual inspections can provide a good deal of information, they do not readily report the magnetic signature of a vehicle, which can reveal additional details about the vehicle contents. Methods are needed for determining that magnetic signature in a cost effective and reliable manner.

The situation has some significant hurdles. Running wires to sensors embedded in roadways turns out to be difficult, expensive, and often unreliable in the rugged environment of a roadway with multiple ton vehicles rolling over everything on a frequent basis. What is needed is a way to use a wireless vehicular sensor node to report something approximating the raw vehicular sensor waveform via wireless communications.

SUMMARY OF THE INVENTION

The invention includes using a first, and a second, wireless vehicular sensor node to wirelessly receive a first vehicular waveform report from the first wireless vehicular sensor node time-interleaved with a second vehicular waveform report from the second wireless vehicular sensor node.

Each vehicular waveform report approximates a raw vehicular sensor waveform observed by a magnetic sensor at the vehicular sensor node based upon the presence of a vehicle. Each wireless vehicular sensor node operates a magnetic sensor. At least one, and often preferably, all the wireless vehicular sensor nodes may include their magnetic sensors. The vehicular waveform reports are products of this process of wirelessly receiving first time-interleaved with the second.

The invention includes apparatus supporting the above outlined process, including means for wirelessly receiving the first vehicular waveform report time-interleaved with the second vehicular waveform report.

A wireless vehicular sensor network may include the first and/or the second wireless vehicular sensor node. Both may preferably be included in the same wireless vehicular sensor network. The wireless vehicular sensor network may further include an access point communicating with both the first wireless vehicular sensor node and the second wireless vehicular sensor node. Wirelessly receiving the first, time-interleaved with the second, vehicular waveform report may further include wirelessly receiving via the access point.

The first vehicular waveform report may be time synchronized with the second. Time synchronization supports a more rigorous analysis of the vehicular waveform reports, due to essentially the same time step between successive reported samples. The invention includes at least two basic approaches to time synchronization.

The first approach, the first raw vehicular sensor waveform observed at the first wireless vehicular sensor node preferably is preferably time synchronized with the second raw vehicular sensor waveform observed at the second wireless vehicular sensor node. The invention may further include both the wireless sensor nodes wirelessly receiving a time synchronization message.

The access point may preferably send the time synchronization message to each of the wireless vehicular sensor nodes. The wireless vehicular sensor network may support the IEEE802.15 communications standard. The wireless vehicular sensor network may support a version of the Global System for Mobile (GSM) communications standard. The version may be compatible with a version of the General Packet Radio Service (GPRS) communications standard.

The wireless vehicular sensor network may support a form of Code Division Multiple Access (CDMA), such as IS-95.

The wireless vehicular sensor nodes preferably send a long report, including a first event time and event samples for successive time steps. In another approach to time synchronization, each long report may include the transmit time observed at the node when the long report was sent.

The means for wirelessly receiving may include at least one instance of at least one of a computer, a finite state machine, and an inferential engine. The instance at least partly implements the method by wirelessly communicating with at least one of the wireless vehicular sensor nodes. The instance may communicate with the nodes via the access point. The access point may include the means for wirelessly receiving. The access point may be a base station communicating with at least one of the first wireless vehicular sensor node and the second wireless vehicular sensor node.

The invention may use more than two wireless vehicular sensor nodes, and include any combination of time-interleaved reception of vehicular waveform reports from three or more wireless vehicular sensor nodes. Time-interleaved reception may include essentially simultaneous reception of spread spectrum messages, for example, for using a CDMA protocol to receive the long reports.

Wirelessly receiving the time-interleaved vehicular waveform reports, may further include wirelessly receiving the time-interleaved vehicular waveform reports, when the observed vehicles are each within a distance of the corresponding magnetic sensors. The node may already determine when a vehicle is close enough, by determining a rising edge and/or a falling edge of a vehicular sensor waveform, which is the result of the vehicle moving near that node. During normal traffic monitoring operations, the node preferably transmits a report of only the waveform characteristics, which may include the rising edge and the falling edge. It may be further preferred that the node report the raw vehicular sensor waveform from a predetermined time before the rising edge until a second predetermined time after the falling edge.

BRIEF DESCRIPTION OF THE DRAWINGS

FIG. 9A shows the first wireless vehicular sensor node including the first magnetic sensor and the first raw vehicular waveform;

FIGS. 9B to 9D show examples of the means for receiving;

FIGS. 16A to 17A show some details of operating the wireless vehicular sensor node to transmit the long report when the vehicle is moving near the node;

DETAILED DESCRIPTION

Figure 1A:
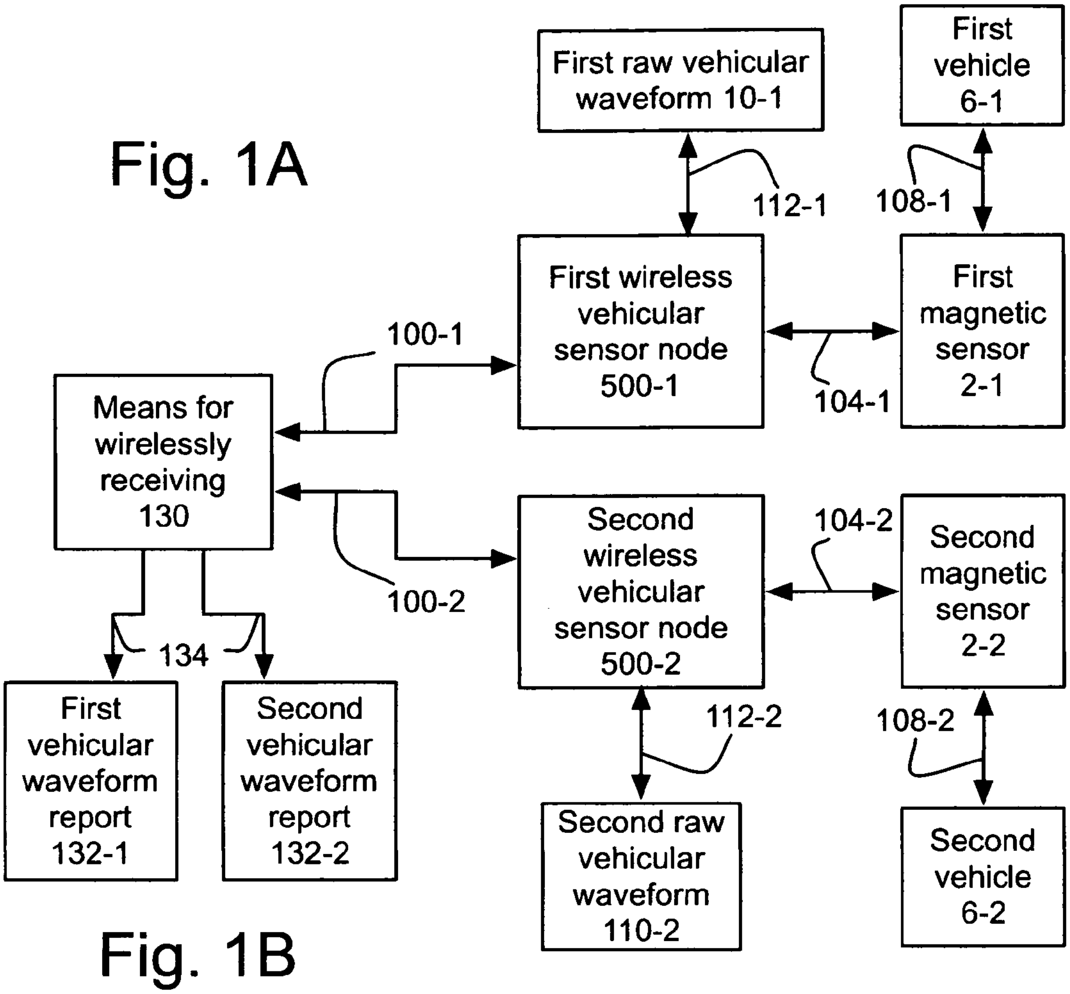
FIG. 1A shows an example of the invention wirelessly receiving time-interleaved vehicular waveform reports from two wireless vehicular sensor nodes operating magnetic sensors.

This invention relates to wireless vehicular sensor networks, in particular, to the reporting of the waveforms approximating the raw sensor readings due to the presence of motor vehicles. The invention includes using multiple wireless vehicular sensor nodes to wirelessly receive multiple time-interleaved vehicular waveform reports from the wireless vehicular sensor nodes. By way of example, the invention uses a first wireless vehicular sensor node 500-1 and a second wireless vehicular sensor node 500-2 to wirelessly receive a first vehicular waveform report 132-1 from the first wireless vehicular sensor node time-interleaved 134 with a second vehicular waveform report 132-2 from the second wireless vehicular sensor node as shown in FIG. 1A.

Each vehicular waveform report approximates a raw vehicular sensor waveform observed by a magnetic sensor at the vehicular sensor node based upon the presence of a vehicle. The first vehicular waveform report 132-1 approximates the first raw vehicular sensor waveform 110-1 observed by a first magnetic sensor 2-1 at the first wireless vehicular sensor node 500-1 based upon the presence of a first vehicle 6-1. The second vehicular waveform report 132-2 approximates the second raw vehicular sensor waveform 110-2 observed by a second magnetic sensor 2-2 at the second wireless vehicular sensor node 500-2 based upon the presence of a second vehicle 6-2.

Figure 13:
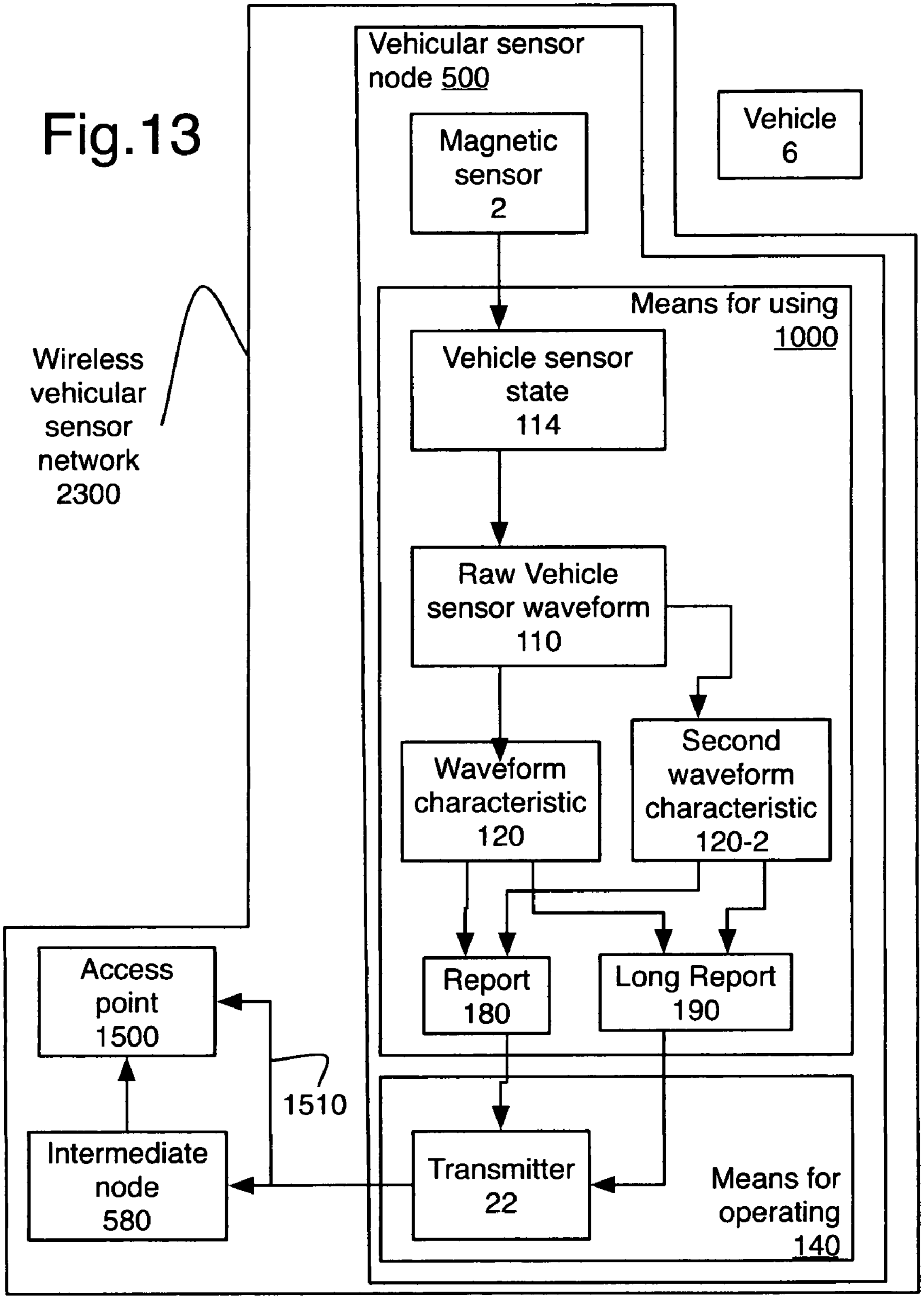
FIGS. 13 and 14 show some examples of a wireless vehicular sensor node of use in the invention.
Figure 14:
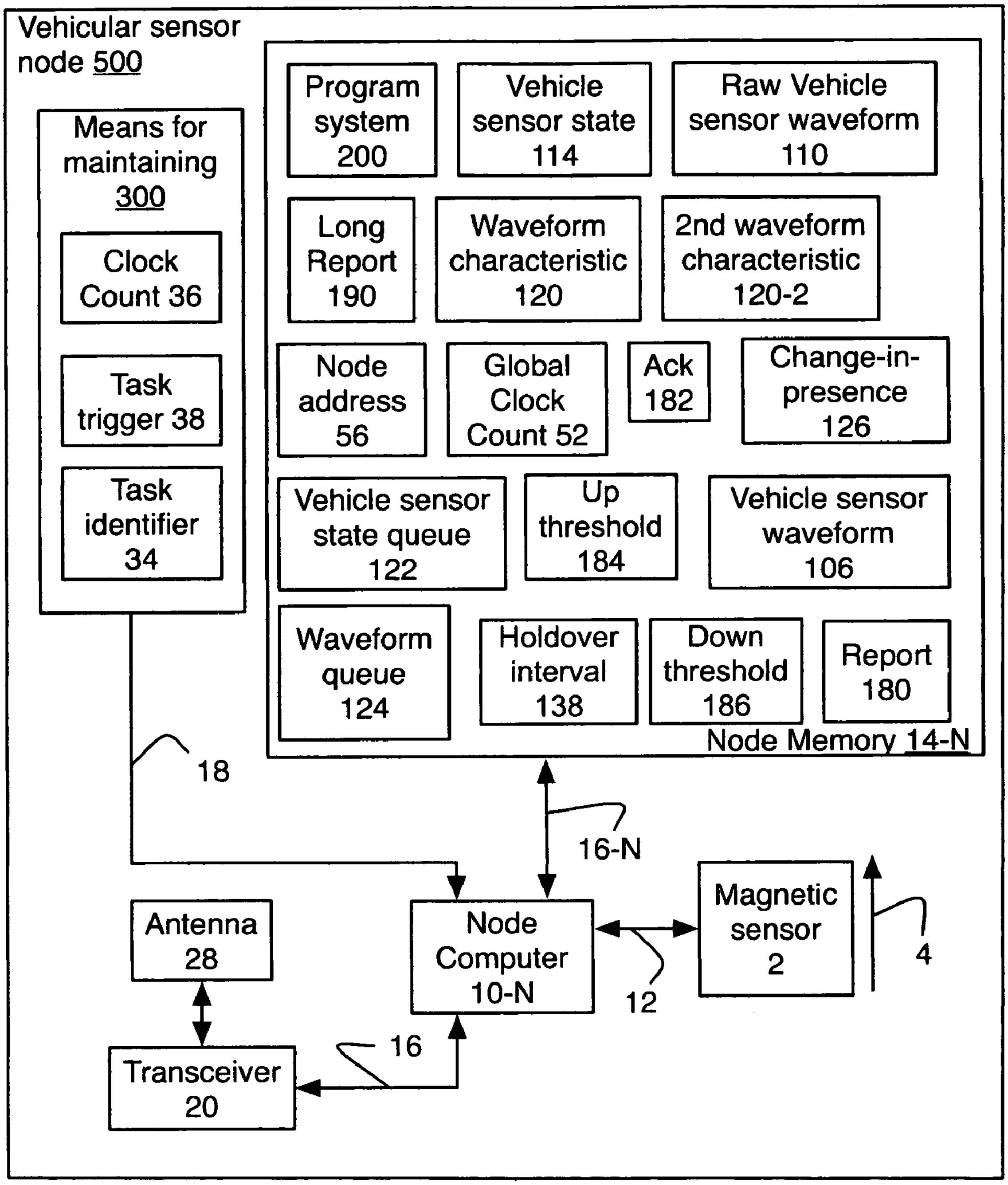

As used herein, each of the invention's wireless vehicular sensor node operates a magnetic sensor. The first wireless vehicular sensor node first operates 104-1 the first magnetic sensor. And the second wireless vehicular sensor node second operates 104-2 the second magnetic sensor. At least one, and often preferably, all the wireless vehicular sensor nodes may include their magnetic sensors. By way of example, FIG. 9A shows the first wireless vehicular sensor node 500-1 include the first magnetic sensor 2-1. The second wireless vehicular sensor node 500-2 may include the second magnetic sensor 2-2, as shown in FIG. 9B. Each wireless vehicular sensor node 500 may further include the magnetic sensor 2 as shown in FIGS. 13 and 14.

The first vehicular waveform report 132-1 and the second vehicular waveform report 132-2 are products of the process of wirelessly receiving first vehicular waveform report time-interleaved with the second vehicular waveform report.

The invention includes apparatus supporting the above outlined process, including means for wirelessly receiving 130 the first vehicular waveform report 132-1 from the first wireless vehicular sensor node 500-1 time-interleaved with the second vehicular waveform report 132-2 from the second wireless vehicular sensor node 500-2.

The means for wirelessly receiving 130 may first wirelessly communicate 100-1 with the first wireless vehicular sensor node 500-1. The means for wirelessly receiving may also second wirelessly communicate 100-2 with the second wireless vehicular sensor node 500-2. Note that these wireless communications may or may not use the same physical transports and/or communications protocols. These wireless communications may be encrypted, and the communications with one wireless vehicular sensor node may or may not be decipherable by the other wireless vehicular sensor node.

The time-interleaved reception 134 is shown through a series of snapshots of the means for wirelessly receiving 130 of FIG. 1A including the first vehicular waveform report 132-1 and the second vehicular waveform report 132-2, as shown in FIGS. 1B to 2D. The means for wirelessly receiving may in certain embodiments, not include the first vehicular waveform report and the second vehicular waveform report, which is shown in FIG. 1A.

Figure 1B:
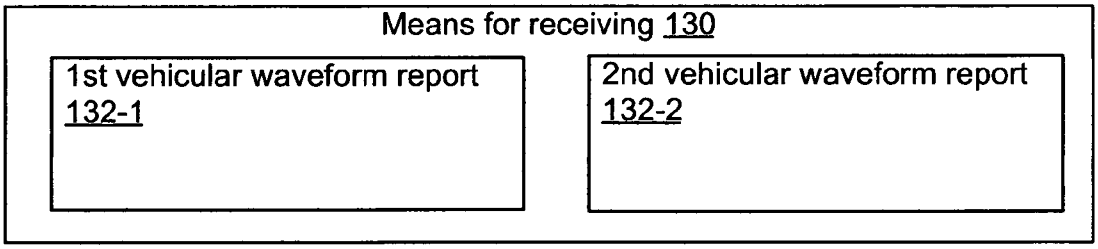
FIGS. 1B to 2D show examples of time-interleaved reception of the vehicular waveform reports of FIG. 1A.

FIG. 1B shows an example of an initial state for the first vehicular waveform report and the second vehicular waveform report.

Figure 1C:
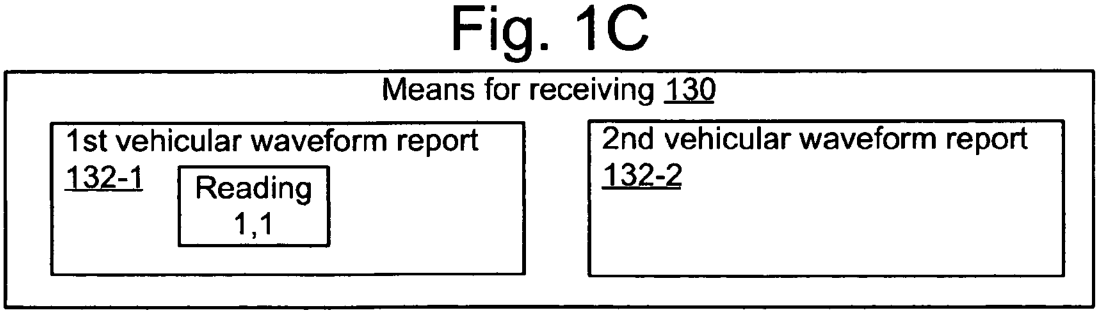

FIG. 1C may show the next time step from FIG. 1C with the means for wirelessly receiving including the first vehicular waveform report has wirelessly received a first reading of the first vehicle Reading 1,1. And the second vehicular waveform report is still in its initial condition.

Figure 2A:
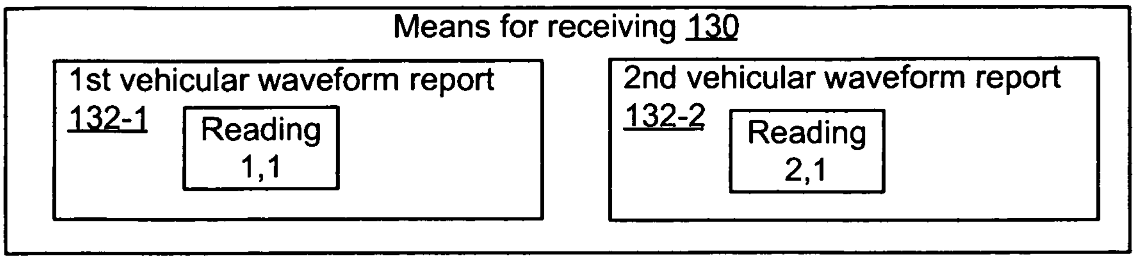

FIG. 2A may show the next time step from FIG. 1C with the means for wirelessly receiving including the first vehicular waveform report has wirelessly received a first reading of the first vehicle Reading 1,1. And the second vehicular waveform report has wirelessly received a first reading of the second vehicle Reading 2,1.

Figure 2B:
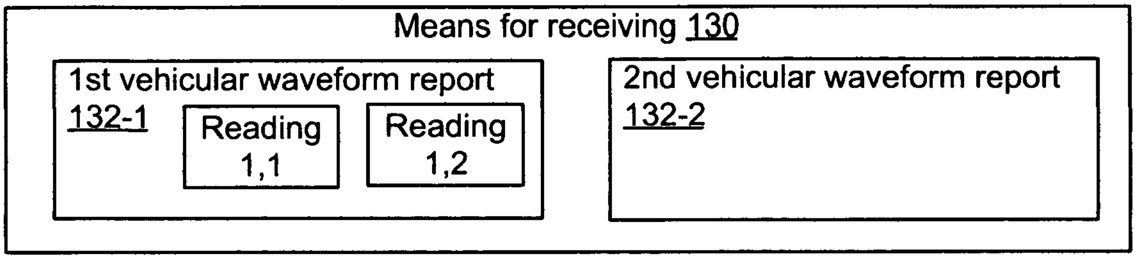

Alternatively FIG. 2B may show the next time step from FIG. 1C with the means for wirelessly receiving including the first vehicular waveform report having wirelessly received a first reading of the first vehicle Reading 1,1 and a second reading of the first vehicle Reading 1,2. And the second vehicular waveform report is still in its initial condition.

Figure 2C:
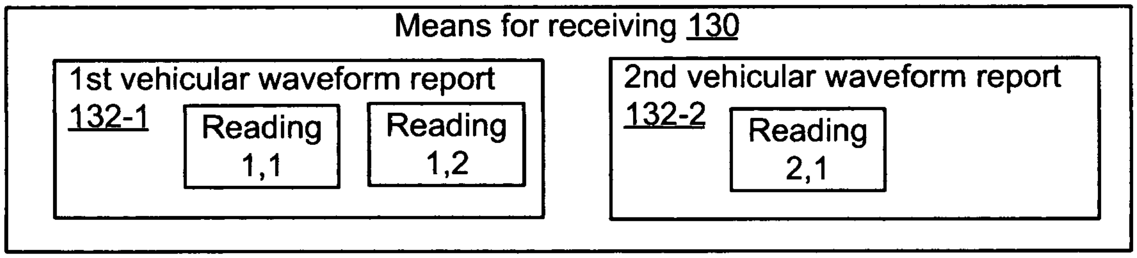

FIG. 2C may show the next time step from either FIG. 2A or FIG. 2B, with the means for wirelessly receiving including the first vehicular waveform report having wirelessly received a first reading of the first vehicle Reading 1,1 and a second reading of the first vehicle Reading 1,2. The second vehicular waveform report has wirelessly received a first reading of the second vehicle Reading 2,1.

Figure 2D:
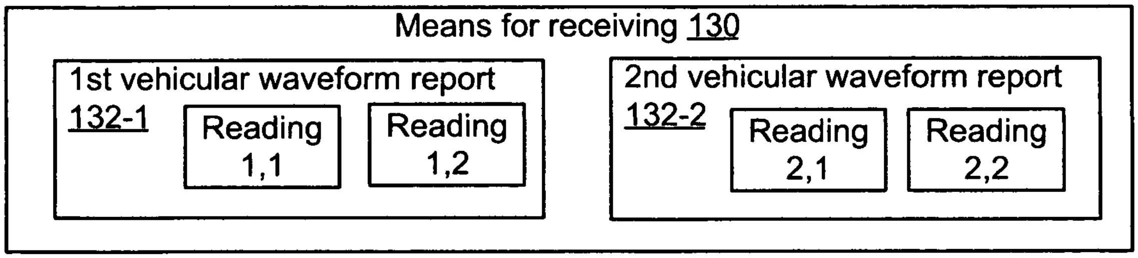

FIG. 2D may show the next time step from either FIG. 2A or FIG. 2C with the means for wirelessly receiving including the first vehicular waveform report having wirelessly received a first reading of the first vehicle Reading 1,1 and a second reading of the first vehicle Reading 1,2. The second vehicular waveform report has wirelessly received a first reading of the second vehicle Reading 2,1 and a second reading of the second vehicle Reading 2,2.

Figure 3A:
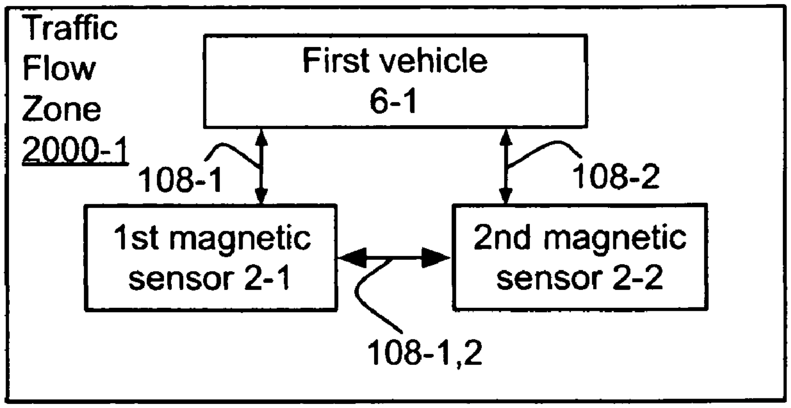
FIGS. 3A to 6 shows various example configurations of the invention.

An example of an embodiment in which the first vehicle 6-1 may be the same as the second vehicle 6-2 is shown in FIG. 3A. The traffic flow zone 2000-1 includes both the first magnetic sensor 2-1 and the second magnetic sensor 2-2, spaced at a distance between first and second sensors 108-1,2 sufficiently small, that the first vehicle 6-1 is observed by both magnetic sensors. By way of example, the distance between first and second sensors may preferably be less than three meters, further preferably less than two meters, possibly as little as one meter. The first distance 108-1 between the first magnetic sensor and the first vehicle, as well as the second distance 108-2 between the second magnetic sensor and the first vehicle, are both preferably less than three meters, and further preferred to be less than two meters, and may further preferably be less than 1 meter.

Figure 3B:
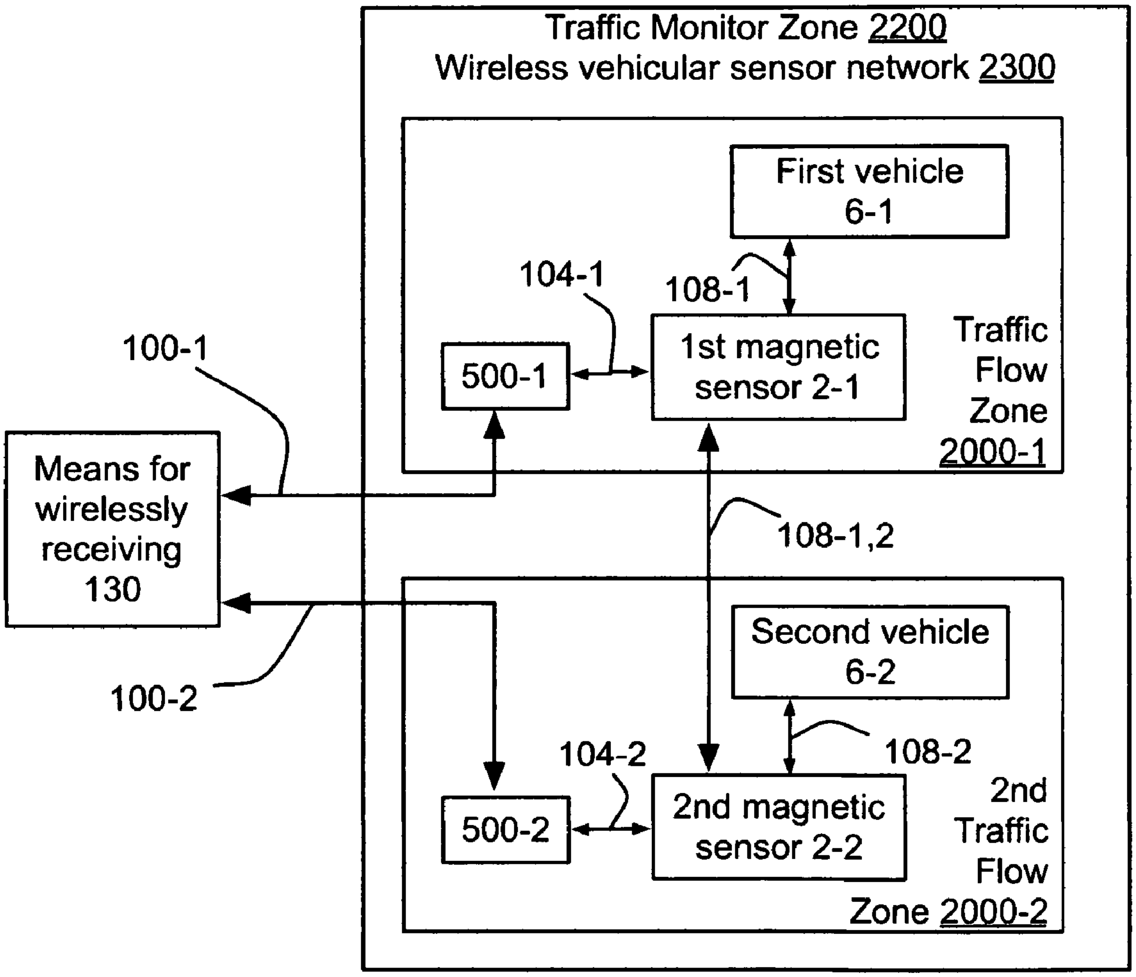

Alternatively, the first vehicle 6-1 may be distinct from the second vehicle 6-2 as shown by the example of FIG. 3B. The first traffic flow zone 2000-1 includes the first magnetic sensor 2-1. The second traffic flow zone 2000-2 includes the second magnetic sensor 2-2. The first magnetic sensor 2-1 and the second magnetic sensor 2-2 are spaced at a distance between first and second sensors 108-1,2 sufficiently large, so that the first vehicle is observed by only the first magnetic sensor, and the second vehicle is observed only by the second magnetic sensor. By way of example, the distance between first and second sensors may preferably be more than one meter, further preferably more than two meters, further preferred, more than three meters.

A wireless vehicular sensor network may include the first and/or the second wireless vehicular sensor node. Both may preferably be included in the same wireless vehicular sensor network.

Figure 5:
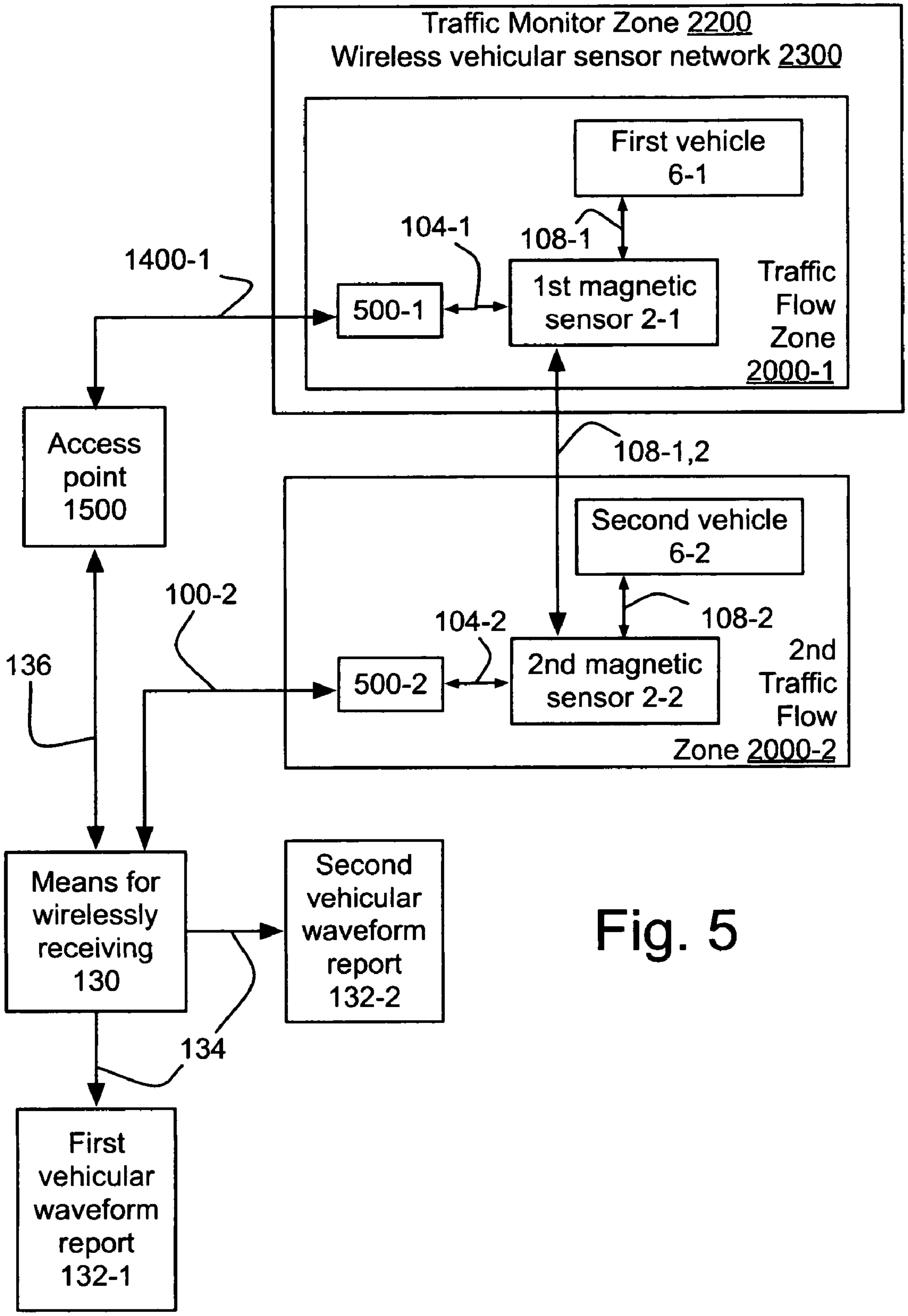

A wireless vehicular sensor network 2300 may include at least one of the first wireless vehicular sensor node 500-1 and the second wireless vehicular sensor node 500-2. By way of example, the wireless vehicular sensor network may include exactly one wireless vehicular sensor node used for receiving the vehicular waveform report, as shown in FIG. 5 with network including the first wireless vehicular sensor node. Both may preferably be included in the same wireless vehicular sensor network, as shown in FIG. 3B.

The wireless vehicular sensor network may further include an access point communicating with both the first wireless vehicular sensor node and the second wireless vehicular sensor node. The wireless vehicular sensor network may further include an access point 1500 communicating with both the first wireless vehicular sensor node and the second wireless vehicular sensor node as shown in FIG. 4.

Figure 6:
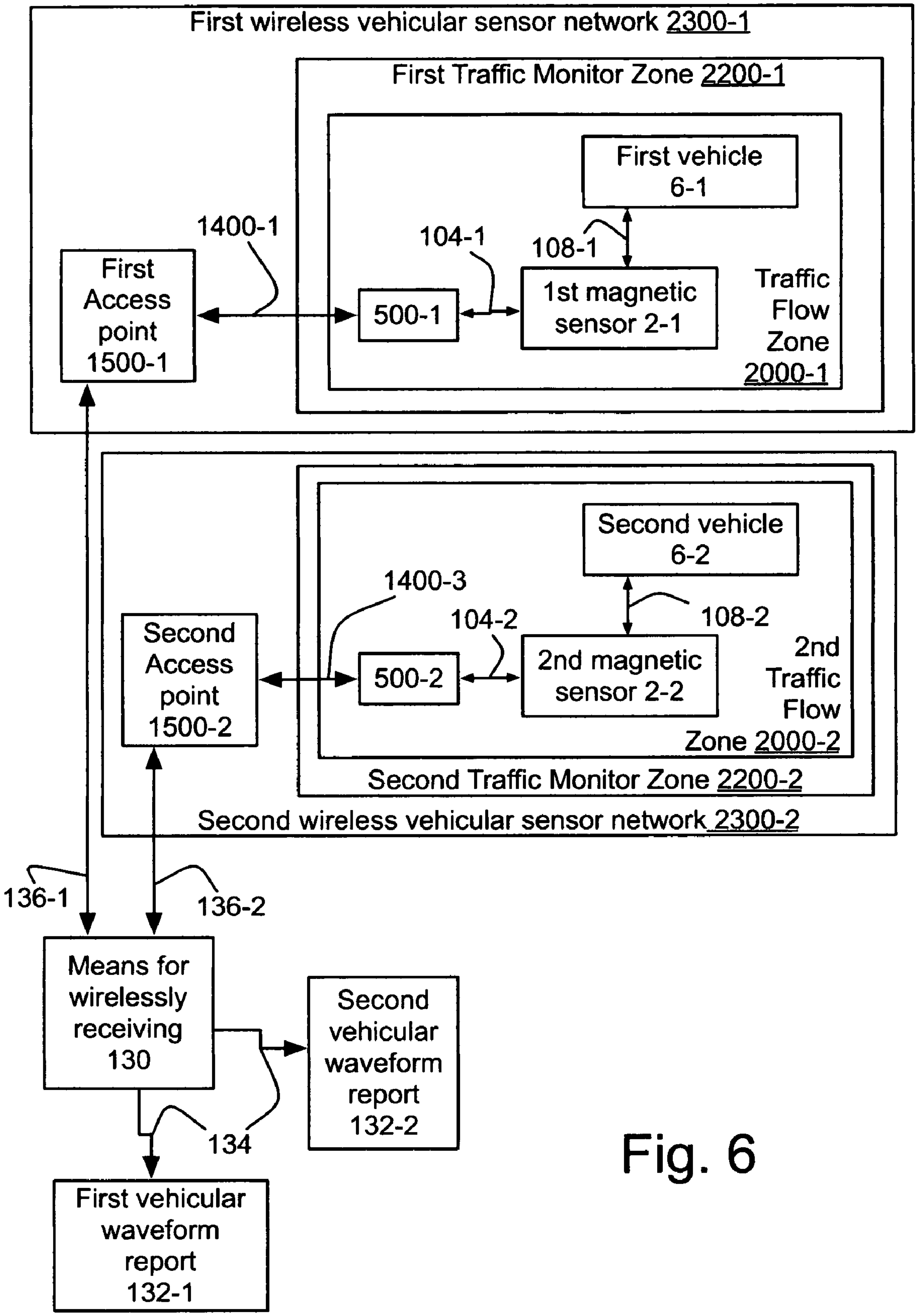

FIG. 6 shows another example of wireless vehicular sensor networks and access points. The first wireless vehicular sensor network 2300-1 includes the first wireless vehicular sensor node wirelessly communicating with a first access point 1500-1. The second wireless vehicular sensor network 2300-2 includes the second wireless vehicular sensor node wirelessly communicating with a second access point 1500-2.

Wirelessly receiving the first, time-interleaved with the second, vehicular waveform report may further include wirelessly receiving via the access point. This may include wirelessly receiving via the access point 1500 the first vehicular waveform report 132-1 from the first wireless vehicular sensor node 500-1 time-interleaved with the second vehicular waveform report 132-2 from the second wireless vehicular sensor node 500-2.

Figure 4:
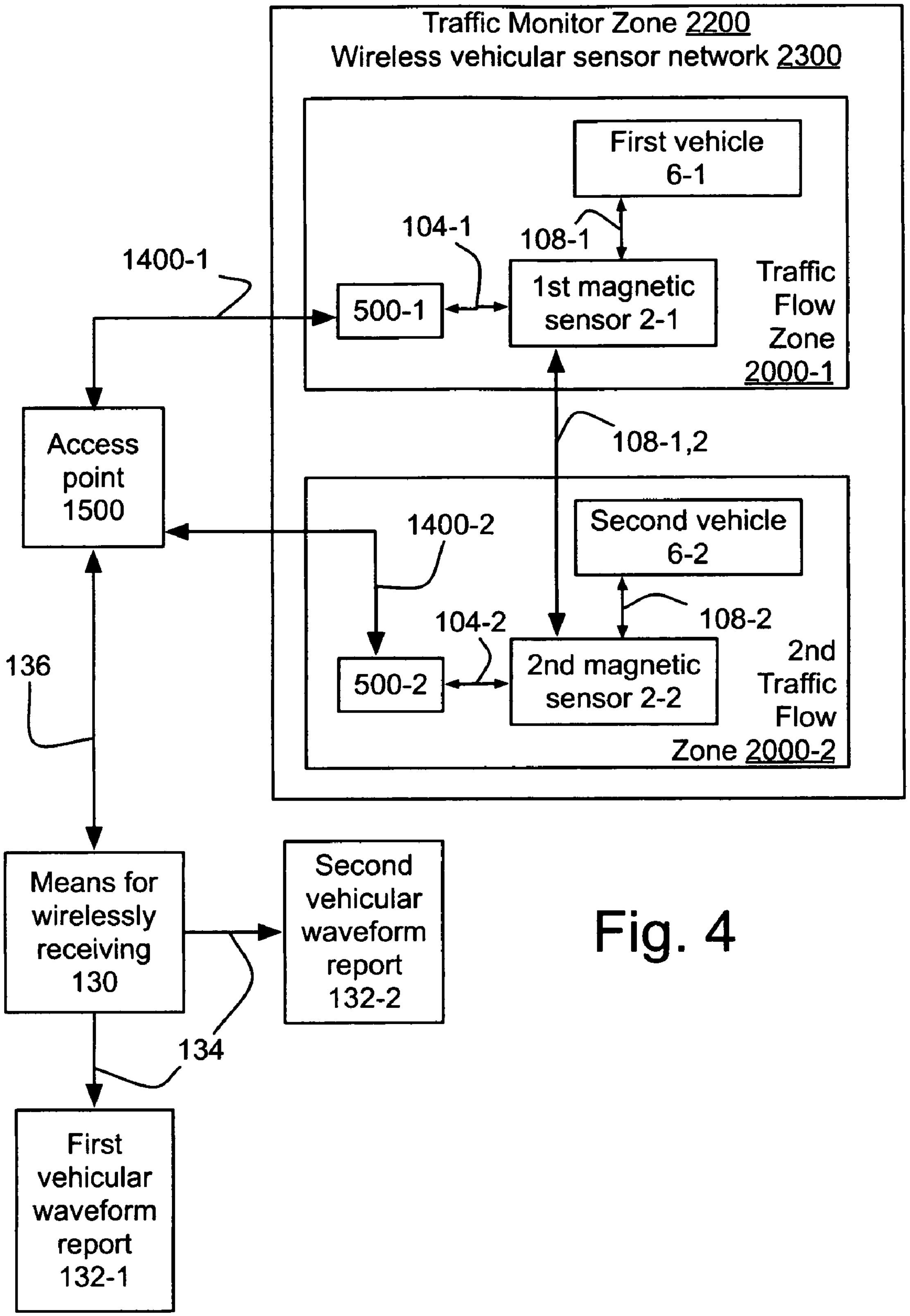

By way of example, the means for wirelessly receiving the first, time-interleaved 134 with the second, vehicular waveform report may include the means for wirelessly receiving 130 via 136 the access point 1500 the first vehicular waveform report 132-1 from the first wireless vehicular sensor node 500-1 time-interleaved with the second vehicular waveform report 132-2 from the second wireless vehicular sensor node 500-2, as in FIG. 4. The access point is first wireless network coupled 1400-1 to the first wireless vehicular sensor node 500-1. And the access point is second wireless network coupled 1400-2 to the second wireless vehicular sensor node 500-2.

Another example, the means for wirelessly receiving 130 the first, time-interleaved 134 with the second, vehicular waveform report may further include an access point 1500 for wirelessly communicating with one but not both wireless vehicular sensor nodes, as shown in FIG. 5. Means for wirelessly receiving 130 uses via 136 with the access point for the first vehicular waveform report 132-1 from the first wireless vehicular sensor node 500-1. The means for receiving is second wirelessly communicating 102-2 with the second wireless vehicular sensor node 500-2 for the second vehicular waveform report 132-2.

Another example, the means for wirelessly receiving 130 the first, time-interleaved 134 with the second, vehicular waveform report may further include using two access points, for two wireless vehicular sensor networks to wirelessly communication with the wireless vehicular sensor nodes, as shown in FIG. 6. Means for wirelessly receiving 130 uses first via 136-1 with the first access point 1500-1 for the first vehicular waveform report 132-1 from the first wireless vehicular sensor node 500-1. The means for wirelessly receiving uses second via 136-2 with the second access point 1500-2 the second vehicular waveform report 132-2 from the second wireless vehicular sensor node 500-2.

The first vehicular waveform report may be time synchronized with the second. Time synchronization supports a more rigorous analysis of the vehicular waveform reports, due to essentially the same time step between successive reported samples. There are at least two basic approaches to time synchronization.

Figure 7:
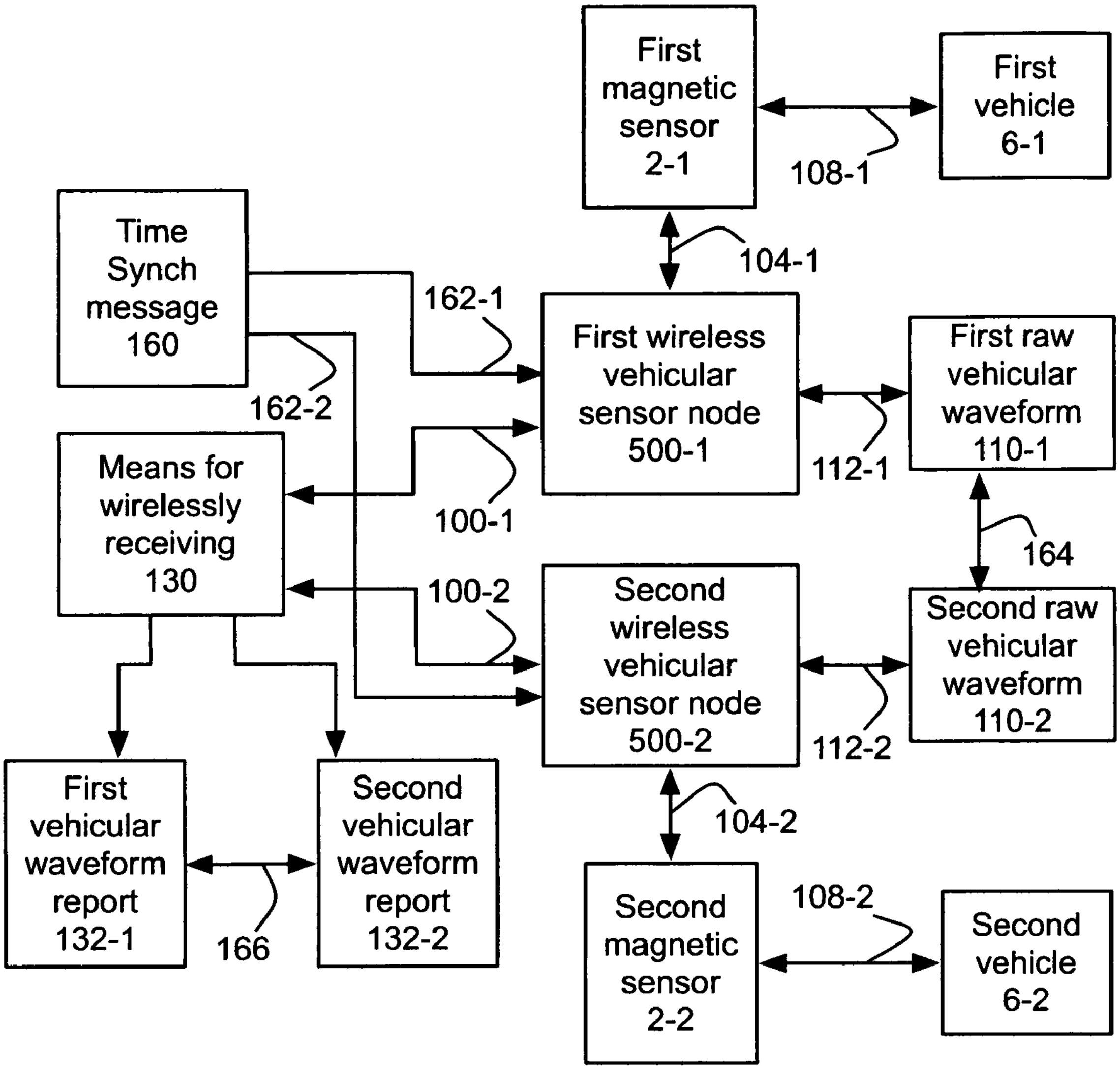
FIGS. 7 and 8A show some examples of the time-synchronized vehicular waveform reports shown over time.
Figure 8A:
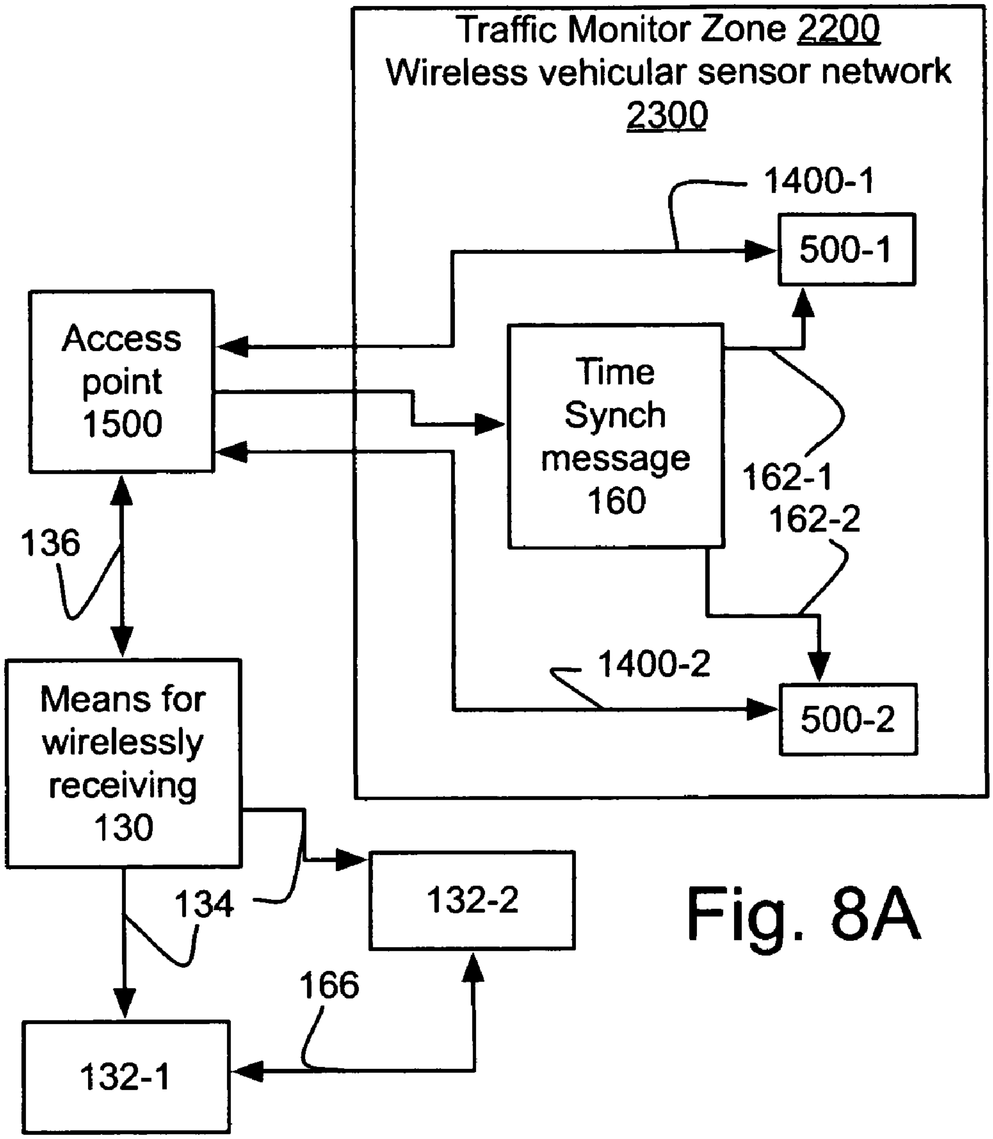

The first approach, the first raw vehicular sensor waveform observed at the first wireless vehicular sensor node preferably is preferably time synchronized with the second raw vehicular sensor waveform observed at the second wireless vehicular sensor node. The invention may further include both the wireless sensor nodes wirelessly receiving a time synchronization message. The first wireless vehicular sensor node 500-1 and the second wireless vehicular sensor node 500-2 both receive the time synchronization message 160 as shown in FIGS. 7 and 8A. The first raw vehicular sensor waveform 110-1 observed at the first wireless vehicular sensor node may preferably be raw time synchronized 164 with the second raw vehicular sensor waveform 110-2 observed at the second wireless vehicular sensor node. This leads to the first vehicular waveform report 132-1 being report time synchronized 166 to the second vehicular waveform report 132-2.

Figure 8B:
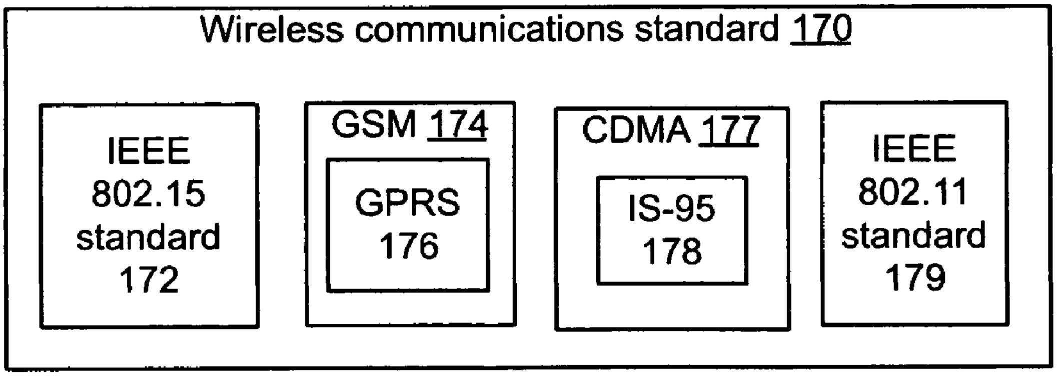
FIG. 8B show some wireless communication standards which may be employed to wirelessly communicate with the wireless vehicular sensor nodes.

The access point may preferably send the time synchronization message. By way of example, the access point 1500 may preferably send 168 the time synchronization message to both the first wireless vehicular sensor node 500-1 and the second wireless vehicular sensor node 500-2, as shown in FIG. 8A. The wireless vehicular sensor network 2300 may support at least one wireless communications standard 170, as shown in FIG. 8B. The network may support the IEEE 802.15 communications standard 172, or a version of the Global System for Mobile or GSM communications standard 174. The version may be compatible with a version of the General Packet Radio Service (GPRS) communications standard 176.

The wireless vehicular sensor network 2300 may support a version of the IS-95 communications standard 178, or a version of the IEEE 802.11 communications standard 179.

The network may support other spread spectrum and/or orthogonal frequency division multiplexing schemes, including but not limited to, Code Division Multiple Access 177, frequency hopping and time hopping scheme.

Figure 15:
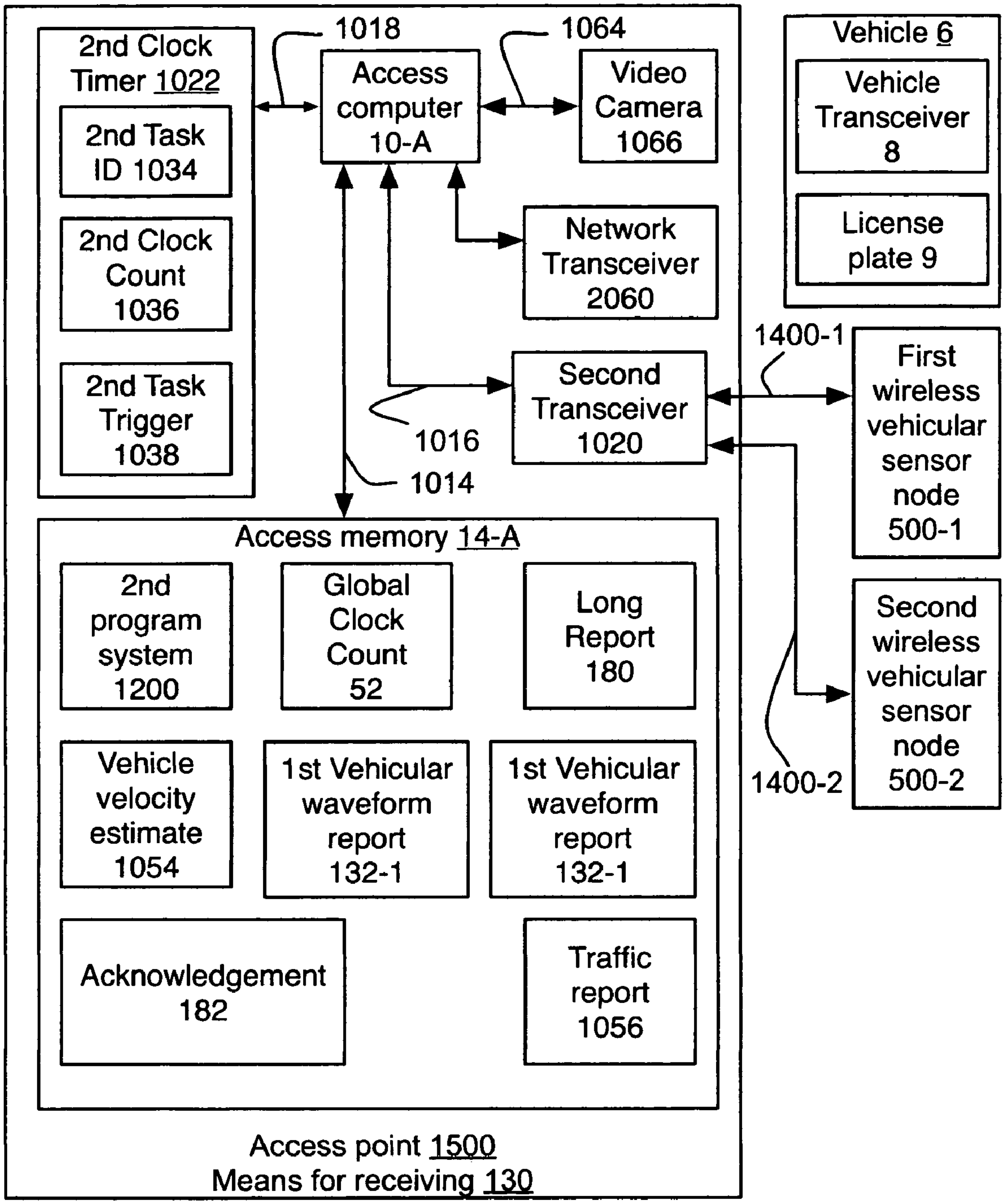
FIG. 15 shows some details of an example access point.
Figure 19A:
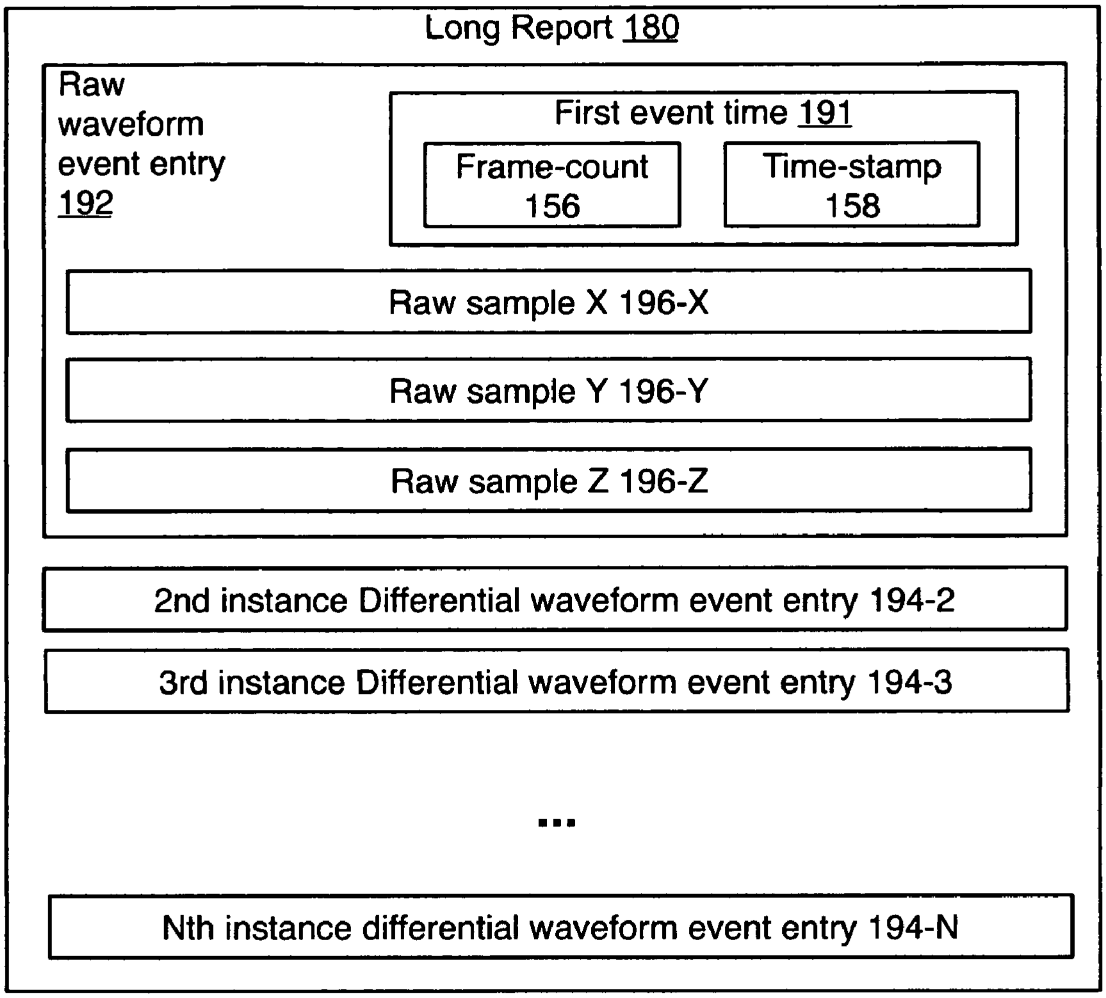
FIGS. 19A and 19B show some details of an example of the long report.

The wireless vehicular sensor nodes preferably send a long report, including a first event time and event samples for successive time steps. The long report 190 is preferably generated within the wireless vehicular sensor node 500, as shown in FIGS. 13 and 14, then transmitted to the means for using 130 and/or the access point 1500, as shown in FIG. 15. The long report includes a first event time 191 and event samples for successive time steps, as shown in FIG. 19A. The long report may further preferably be at least part, and often all, of the data payload of a packet in a wireless vehicular sensor network 2300 of FIG. 3B to 6, and 8A, as the wireless communications standard 170 of FIG. 8B.

The long report 190 may further preferably include a raw waveform event entry 192 including the first event time, a raw sample X 196-X, a raw sample Y 196-Y, and a raw sample Z 196-Z. the first event time may include a frame-count 156 and a time-stamp 158, which will be further discussed regarding the use of the vehicular sensor node for traffic monitoring.

Figure 19B:
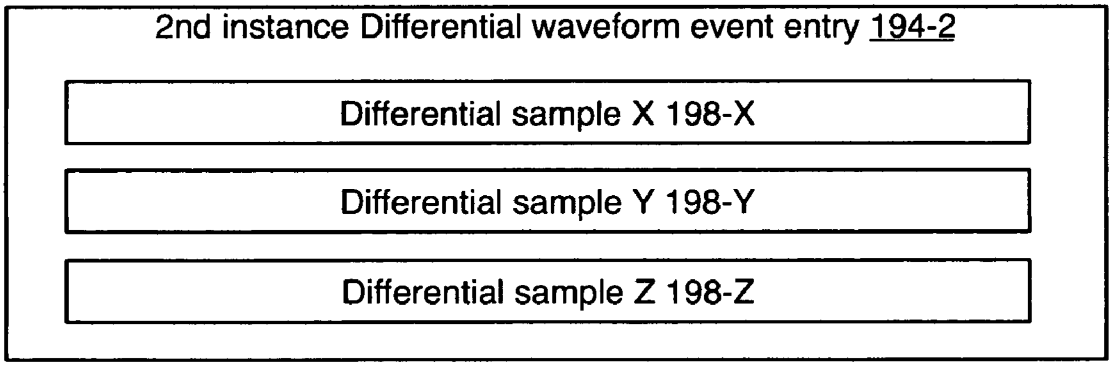

The event samples of successive time steps may be reported with an instance of a differential waveform event entry 194, each of which includes a differential sample of X 198-X, a differential sample of Y 198-Y, and a differential sample of Z 198-Z, as shown in FIG. 19B.

The long report 190 preferably includes the raw waveform event entry 192 and N-1 instances of the differential waveform event entry 194. N may be preferred to be a power of two, and may further be preferred to be sixteen. The time step is preferably chosen to support at least 128 samples per second, further preferably supporting 256 samples per second. Each of the raw samples, X, Y, and Z, may preferably be represented by an integer or fixed point number of at least 8 bits, preferably, 12 bits, and further preferably 16 bits. The long report may further be compressed at the wireless vehicular sensor node using code compression techniques such as Huffman coding. The instances of the differential waveform entry shown in FIG. 19A are as follows: the second instance of the differential waveform entry 194-2, the third instance of the differential waveform entry 194-3, and the N-th instance of the differential waveform entry 194-N.

Figure 23A:
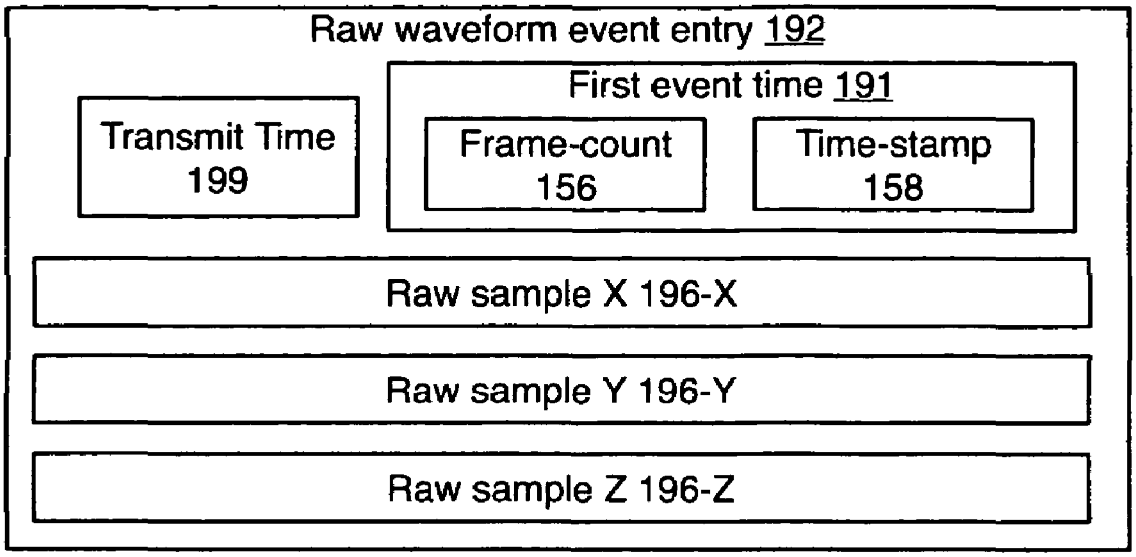
FIG. 23A shows the long report further including the transmit time for the long report, in support of the second approach to time synchronization.

In another approach to time synchronization, each long report 190 may include the transmit time 199 observed at the node when the long report was sent. FIG. 23A shows an extension to the raw waveform event entry 192 of FIG. 19A, which further includes a transmit time 199. This approach supports the first vehicular waveform report 132-1 report time synchronized 166 with the second vehicular waveform report 132-2, without any assurance of time synchronization of the first wireless vehicular sensor node 500-1 with the second wireless vehicular sensor node 500-2.

The means for wirelessly receiving may include at least one instance of at least one of a computer, a finite state machine, and an inferential engine. The instance at least partly implements the method by wirelessly communicating with at least one of the wireless vehicular sensor nodes. The instance may communicate with the wireless vehicular sensor nodes via an access point.

The access point may include the means for wirelessly receiving. The access point may be a base station communicating with at least one of the first wireless vehicular sensor node and the second wireless vehicular sensor node.

By way of example, the means for wirelessly receiving 130 may include at least one instance of a computer 12 at least partly implementing the method as shown in FIG. 9B by communicating via a receiver 18 with the first wireless vehicular sensor node 500-1 to wirelessly receive 102-1 the first vehicular waveform report 132-1, and with the second wireless vehicular sensor node 500-2 to second wirelessly receive 102-2 the second vehicular waveform report 132-2.

The computer 12 is preferably accessibly coupled 16 with a memory 14 including at least one program step included in a program system 600 directing the computer in implementing the method.

The computer 12 communicating with the first and second wireless vehicular sensor nodes may further include the computer communicating via the access point 1500 with the first wireless vehicular sensor node 500-1 to wirelessly receive 102-1 the first vehicular waveform report 132-1, and with the second wireless vehicular sensor node 500-2 to second wirelessly receive 102-2 the second vehicular waveform report 132-2.

Another example, the means for wirelessly receiving 130 may include at least one instance of a finite state machine 26 at least partly implementing the method as shown in FIG. 9C by communicating via the receiver with the first wireless vehicular sensor node to wirelessly receive the first vehicular waveform report, and with the second wireless vehicular sensor node to wirelessly receive the second vehicular waveform report.

The finite state machine 26 communicating with the wireless vehicular sensor nodes may further include the finite state machine communicating via the access point 1500 with the first wireless vehicular sensor node 500-1 to wirelessly receive 102-1 the first vehicular waveform report 132-1, and with the second wireless vehicular sensor node 500-2 to second wirelessly receive 102-2 the second vehicular waveform report 132-2.

Another example, the means for wirelessly receiving 130 may include at least one instance of an inferential engine 24 at least partly implementing the method as shown in FIG. 9D by communicating via the receiver with the first wireless vehicular sensor node to wirelessly receive the first vehicular waveform report, and with the second wireless vehicular sensor node to wirelessly receive the second vehicular waveform report.

The inferential engine 24 communicating with the wireless vehicular sensor nodes may further include the inferential engine communicating via the access point 1500 with the first wireless vehicular sensor node 500-1 to wirelessly receive 102-1 the first vehicular waveform report 132-1, and with the second wireless vehicular sensor node 500-2 to second wirelessly receive 102-2 the second vehicular waveform report 132-2.

The receiver 18 shown in FIGS. 9B to 9D may preferably be part of a transmitter/receiver, known herein as a transceiver.

The invention may use more than two wireless vehicular sensor nodes, and include any combination of time-interleaved reception of vehicular waveform reports from wireless vehicular sensor nodes.

Figure 18:
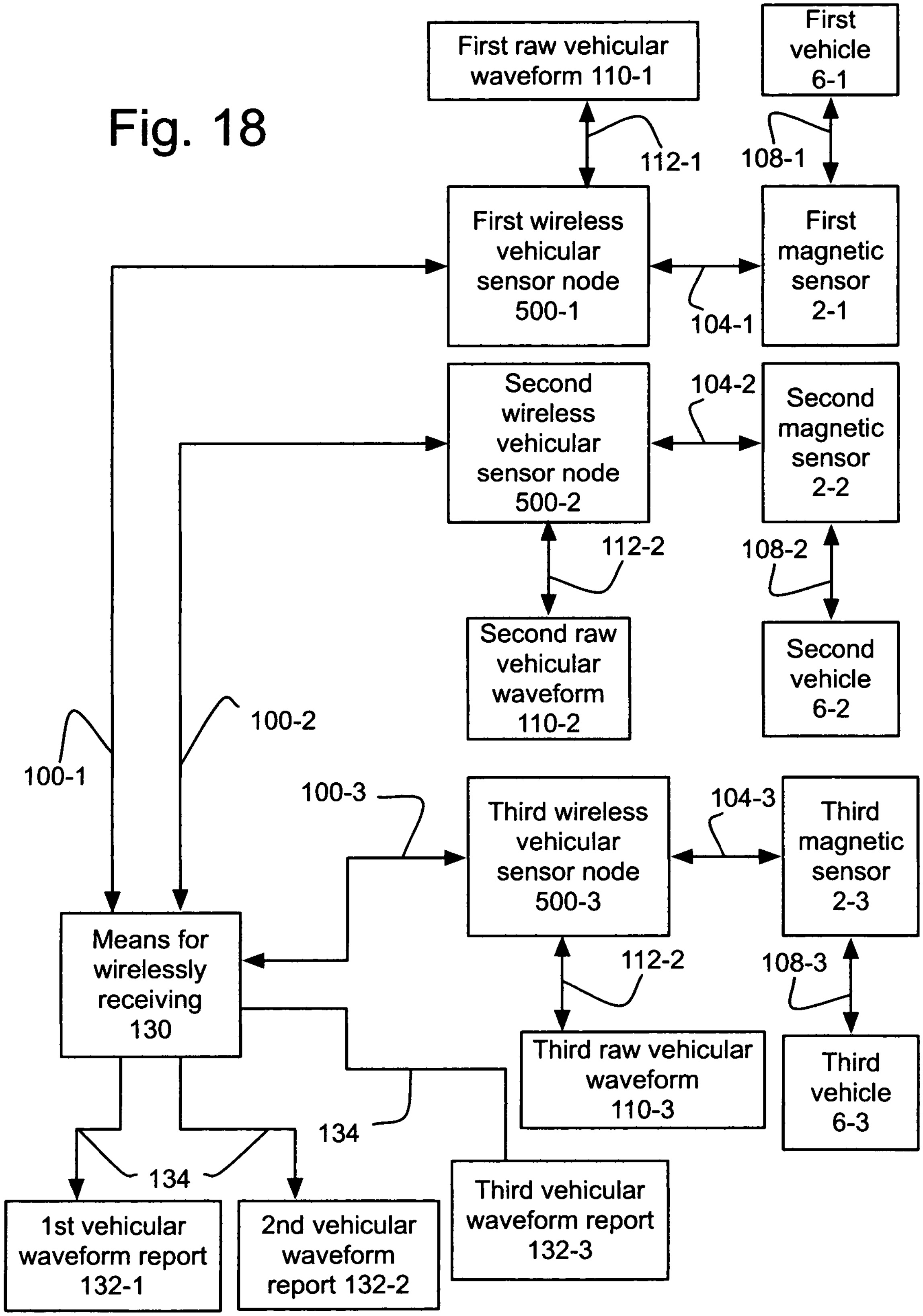
FIG. 18 shows an example of the invention interacting with more than two wireless vehicular sensor nodes for time-interleaved reception of the vehicular waveform reports.

By way of example, consider FIG. 18, which is a refinement of FIG. 1A. The means for receiving 130 may further third wirelessly communicate 100-3 with a third wireless vehicular sensor node 500-3. The third wireless vehicular sensor node may third operate 104-3 a third magnetic sensor 2-3. The third vehicular sensor node may preferably report the presence of a third vehicle 6-3 when it is within a third distance 108-3 via the third wireless communication path 100-3 to the means for receiving 130 to create the third vehicular waveform report 132-3. The third vehicular waveform report 132-3 approximates the third raw vehicular sensor waveform 110-3 observed by the third magnetic sensor at the third wireless vehicular sensor node based upon the presence of the third vehicle.

The following are examples of combinations of time-interleaved reception of the vehicular waveform reports.

Wirelessly receiving 130 the first vehicular waveform report 132-1 from the first wireless vehicular sensor node 500-1 time-interleaved 134 with the third vehicular waveform report 132-3 from a third wireless vehicular sensor node 500-3.

Wirelessly receiving 130 the second vehicular waveform report 132-2 from the second wireless vehicular sensor node 500-2 time-interleaved 134 with the third vehicular waveform report 132-3 from a third wireless vehicular sensor node 500-3.

Wirelessly receiving 130 the first vehicular waveform report 132-1 from the first wireless vehicular sensor node 500-1 time-interleaved 134 with a second vehicular waveform report 132-2 from the second wireless vehicular sensor node 500-2, and time-interleaved 134 with the third vehicular waveform report 132-3 from the third wireless vehicular sensor node 500-3.

Wirelessly receiving the time-interleaved vehicular waveform reports, may further include wirelessly receiving the time-interleaved vehicular waveform reports, when the observed vehicles are each within a distance of the corresponding magnetic sensors.

For example, wirelessly receiving the first time-interleaved with the second vehicular waveform report, may further include wirelessly receiving 130 the first vehicular waveform report 132-1 from the first wireless vehicular sensor node 500-1 time-interleaved 134 with the second vehicular waveform report 132-2 from the second wireless vehicular sensor node 500-2, when the first vehicle 6-1 is within a first distance 108-1 of the first magnetic sensor 2-1, and when the second vehicle 6-2 is within a second distance 108-2 of the second magnetic sensor 2-2, as shown in FIGS. 1A and 3A to 7.

The first distance 108-1 may be essentially the same as the second distance 108-2. Alternatively, the first distance may be distinct from the second distance. Both the first distance and the second distance may be at most three meters. Further preferred, both may be at most two meters. Further, both may be at most one meter.

Wirelessly receiving the time-interleaved vehicular waveform reports, may further include wirelessly receiving the time-interleaved vehicular waveform reports, when the observed vehicles are each within a distance of the corresponding magnetic sensors. The node may already determine when a vehicle is close enough, by determining a rising edge and/or a falling edge of a vehicular sensor waveform, which is the result of the vehicle moving near that node. During normal traffic monitoring operations, the node preferably transmits a report of only the waveform characteristics, which may include the rising edge and the falling edge. It may be further preferred that the node report the raw vehicular sensor waveform from a predetermined time before the rising edge until a second predetermined time after the falling edge.

The invention adds the ability to control turning on and off the vehicular waveform report 132-1 and 132-2 from the wireless vehicular sensor nodes 100-1 and 100-2 based upon whether a vehicle 6 is present or not present. These reports preferably start shortly before the rising edge 108 and continue until shortly after the falling edge 110. By way of example, the operation of a wireless vehicular sensor node 500 may be discussed in terms of a program system 200, as shown in FIG. 14. The wireless vehicular sensor node may include a node computer 10-N node-accessibly coupled 16-N to a node memory 14-N. The program system preferably includes program steps residing in the node memory.

Some of the following figures show flowcharts of at least one method of the invention, which may include arrows with reference numbers. These arrows signify a flow of control, and sometimes data, supporting various implementations of the method. These include at least one the following: a program operation, or program thread, executing upon a computer; an inferential link in an inferential engine; a state transition in a finite state machine; and/or a dominant learned response within a neural network.

The operation of starting a flowchart refers to at least one of the following. Entering a subroutine or a macro instruction sequence in a computer. Entering into a deeper node of an inferential graph. Directing a state transition in a finite state machine, possibly while pushing a return state. And triggering a collection of neurons in a neural network. The operation of starting a flowchart is denoted by an oval with the word “Start” in it.

The operation of termination in a flowchart refers to at least one or more of the following. The completion of those operations, which may result in a subroutine return, traversal of a higher node in an inferential graph, popping of a previously stored state in a finite state machine, return to dormancy of the firing neurons of the neural network. The operation of terminating a flowchart is denoted by an oval with the word “Exit” in it.

A computer as used herein will include, but is not limited to, an instruction processor. The instruction processor includes at least one instruction processing element and at least one data processing element. Each data processing element is controlled by at least one instruction processing element.

Figure 12A:
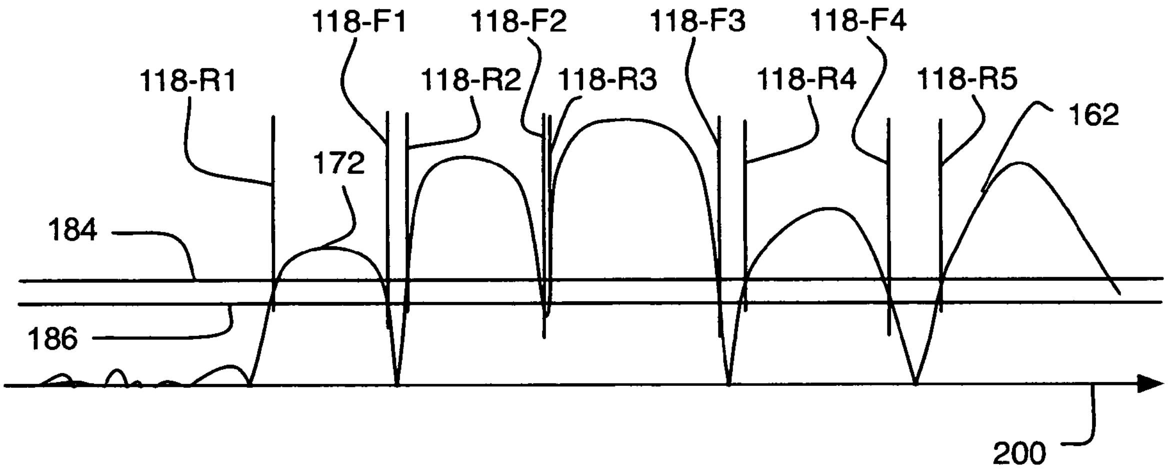
Figure 12B:
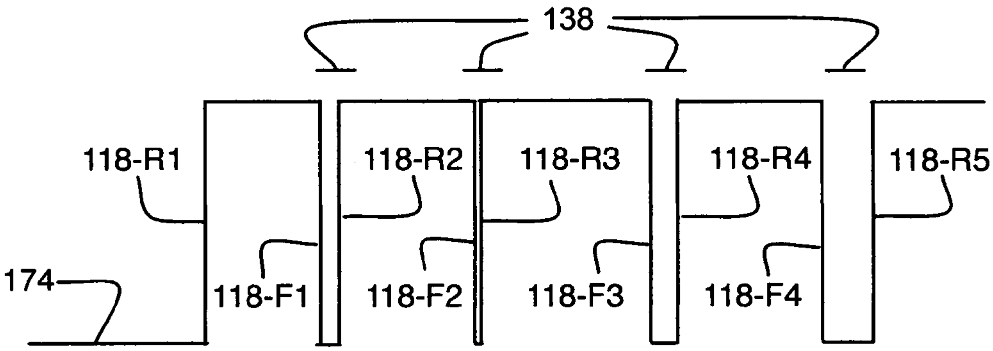
Figure 12C:
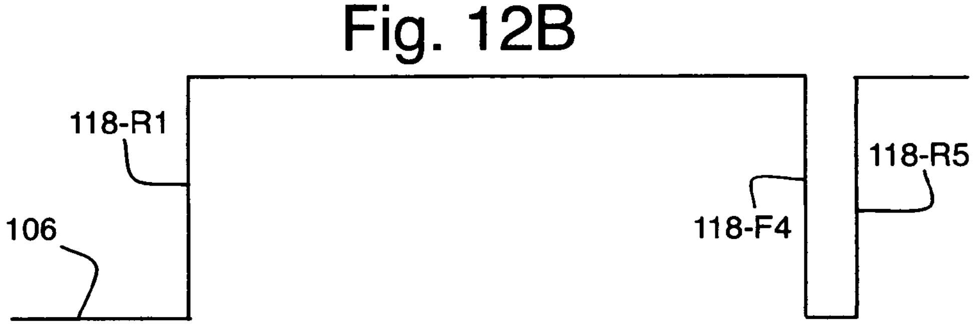
Figure 16A:
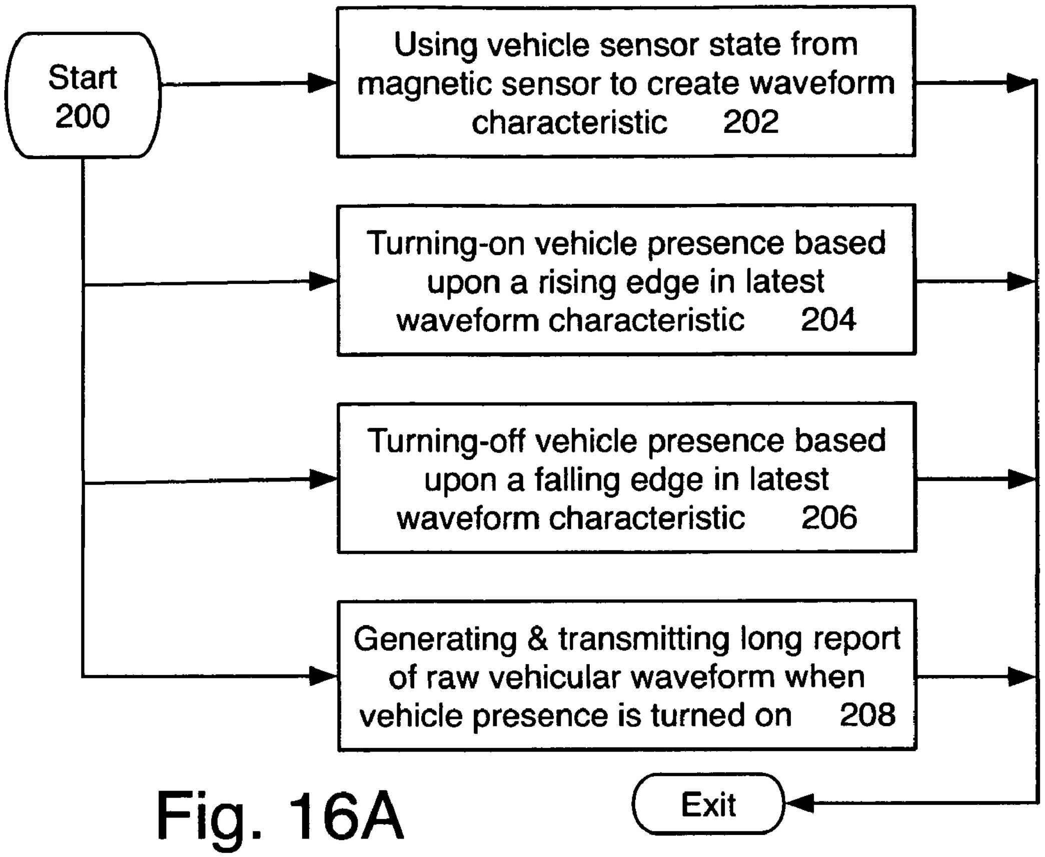

The wireless vehicular sensor node 500 of FIG. 14 may operate as implemented by the program system as shown in FIG. 16A. Operation 202 may support using the vehicle sensor state 114 from the magnetic sensor 2 to create a waveform characteristic 120. The waveform characteristic may preferably be a rising edge 118-R or a falling edge 118-F, as shown and discussed in FIGS. 12A to 12C. Operation 204 supports turning-on the vehicle presence based upon a rising edge in the latest waveform characteristic. Operation 206 supports turning-off the vehicle presence based upon a falling edge in the latest waveform characteristic. Operation 208 supports generating and transmitting a long report 190 of the raw vehicular waveform 110. Recall that the long report was discussed regarding FIGS. 19A, 19B and 23A.

Figure 16B:
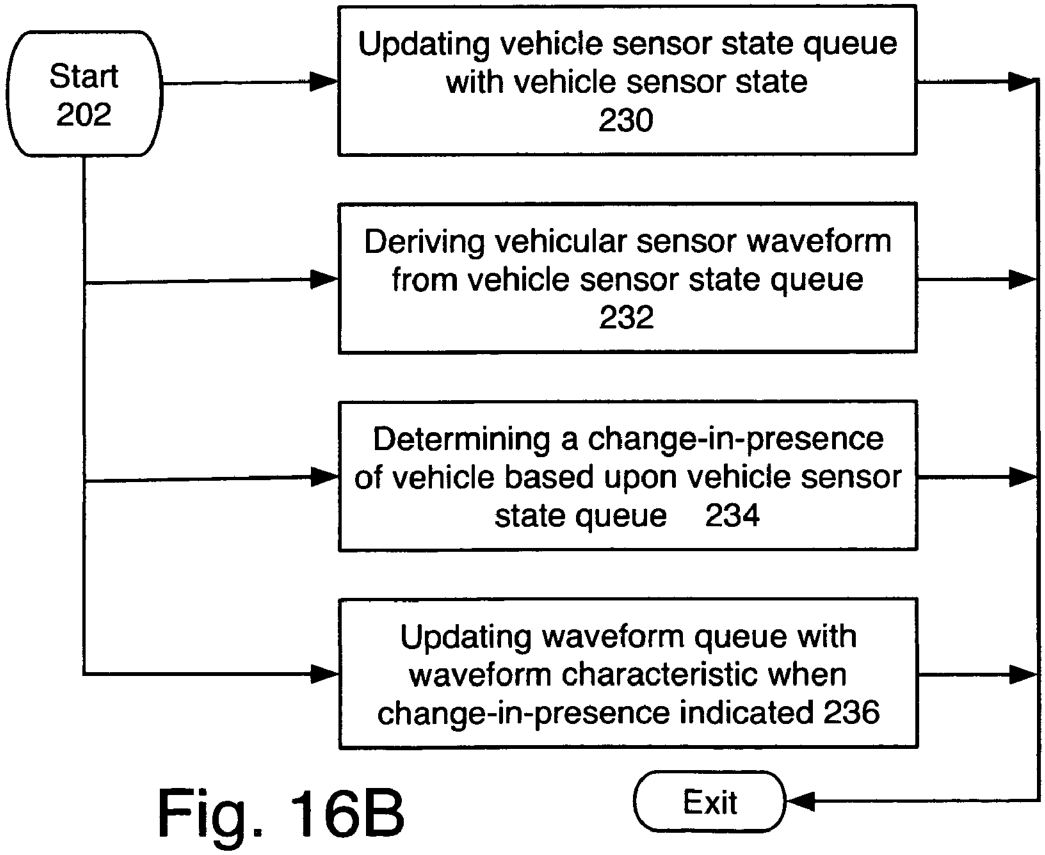

FIG. 16B shows some details of operation 202 of FIG. 16A, further using the vehicle sensor state 114 from the magnetic sensor 2 to create a waveform characteristic 120. Operation 230 supports updating the vehicle sensor state queue 122 of FIG. 14 with the vehicle sensor state. Operation 232 supports deriving the vehicular sensor waveform 106 from the vehicle sensor state queue. Operation 234 supports determining a change-in-presence 126 of the vehicle 6 based upon the vehicle sensor state queue. Operation 236 supports updating the waveform queue 124 with the waveform characteristic when the change-in-presence is indicated.

Figure 10A:
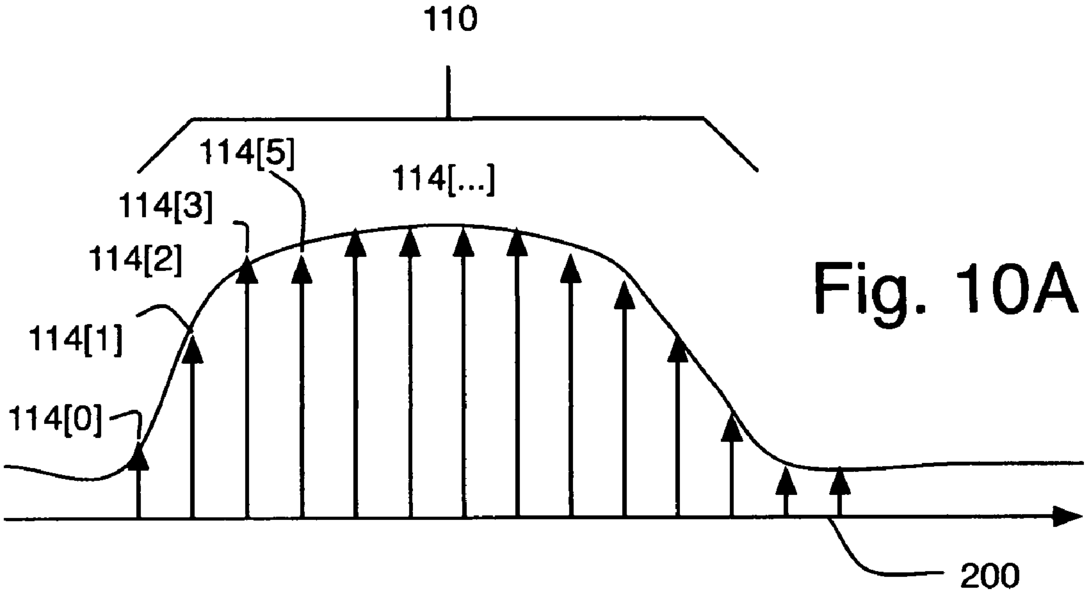
FIGS. 10A to 12C show an example of finding the rising edge and falling edge of the raw vehicular waveform.
Figure 10B:
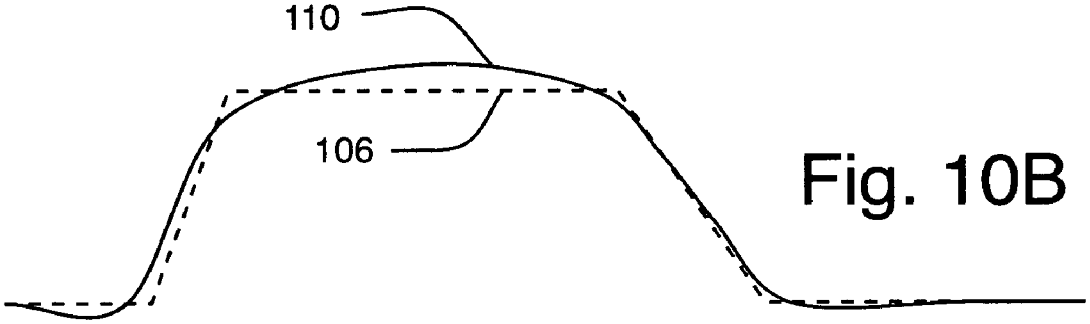
Figure 10C:
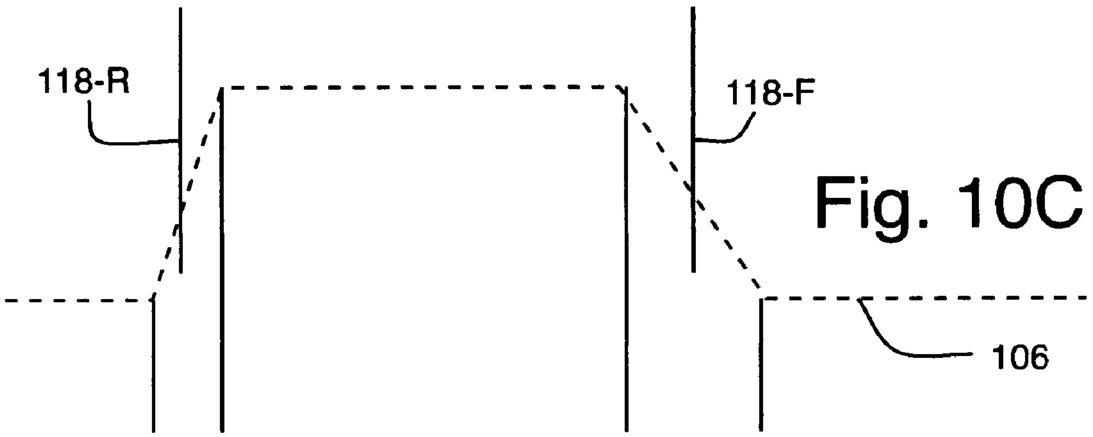

FIG. 10A to FIG. 10C show various aspects of the vehicular sensor waveform 106 created by the invention in response to the presence of a vehicle 6, as shown in FIGS. 13 and 14. A vehicle sensor state 104, is collected over time 200, to create the vehicular sensor waveform, which may preferably be represented by at least one waveform characteristic 120. Such a waveform characteristic may represent a rising edge 108, a falling edge 110, a waveform midpoint 114, and/or a waveform duration 112. In traffic control situations, reporting the rising edge and/or falling edge can help indicate length of a vehicle, which can further help in estimating vehicle velocity.

Figure 11A:
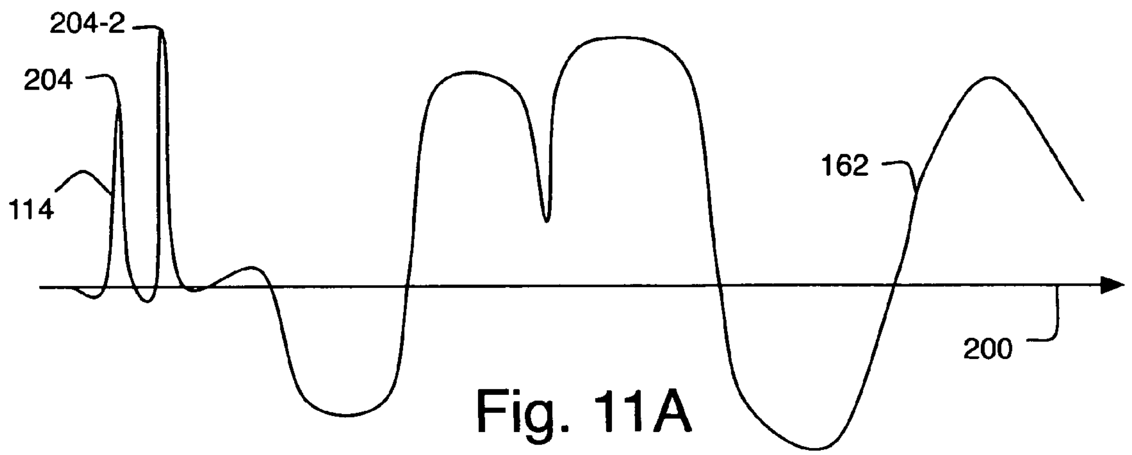
Figure 11B:
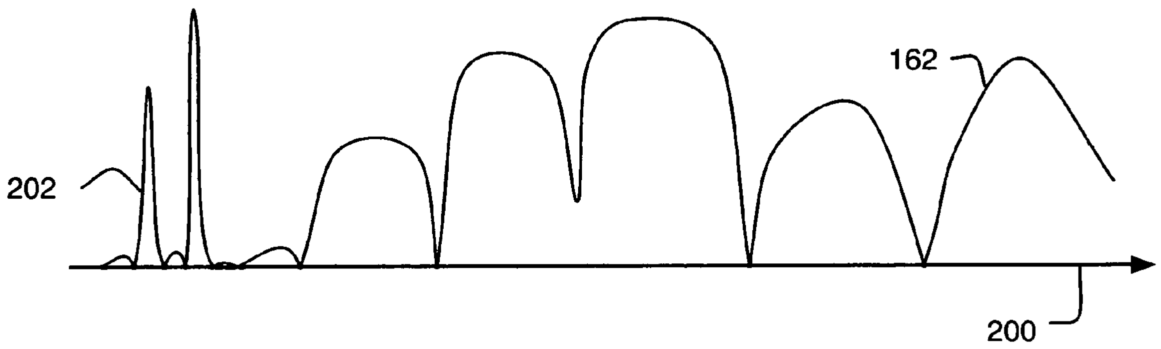
Figure 11C:
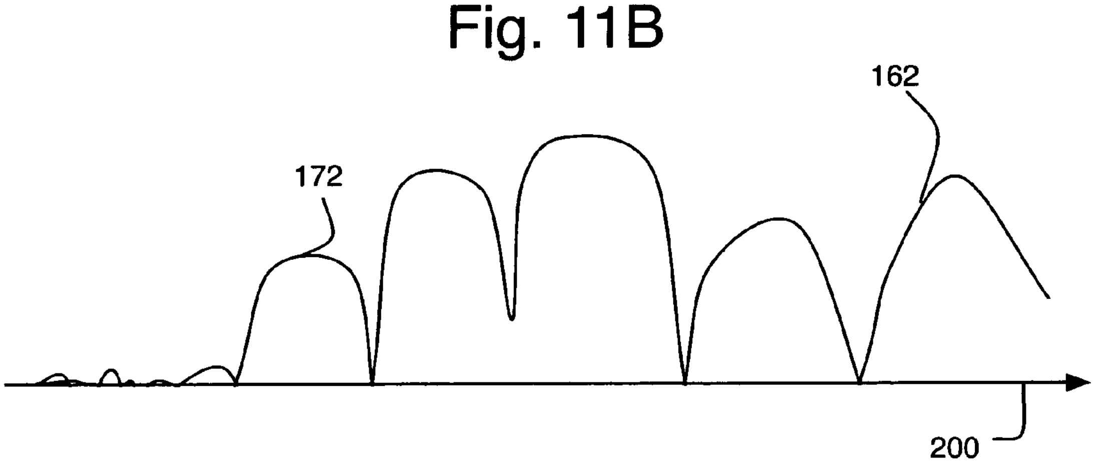

Often, the vehicle sensor state 104, when collected over time 200, is more chaotic, as shown in FIG. 11A. There may be an isolated spike 160, or more than one, as shown by the second isolated spike 160-2. As used herein, an isolated spike will refer to one of a small number of vehicle sensor states, that are large, and surrounded in time by small values of the vehicle sensor state. The small number is shown as one value the isolated spike 204, and two values in the second isolated spike 204-2. In certain embodiments, the small number may be as large as three to five.

The vehicle sensor state 104 may vary quickly in sign, even while one vehicle is passing near the vehicular sensor 2. Also confusing the picture, a second vehicle passing soon after the first vehicle may quickly stimulate the vehicular sensor 2 a second time 162.

Figure 17A:
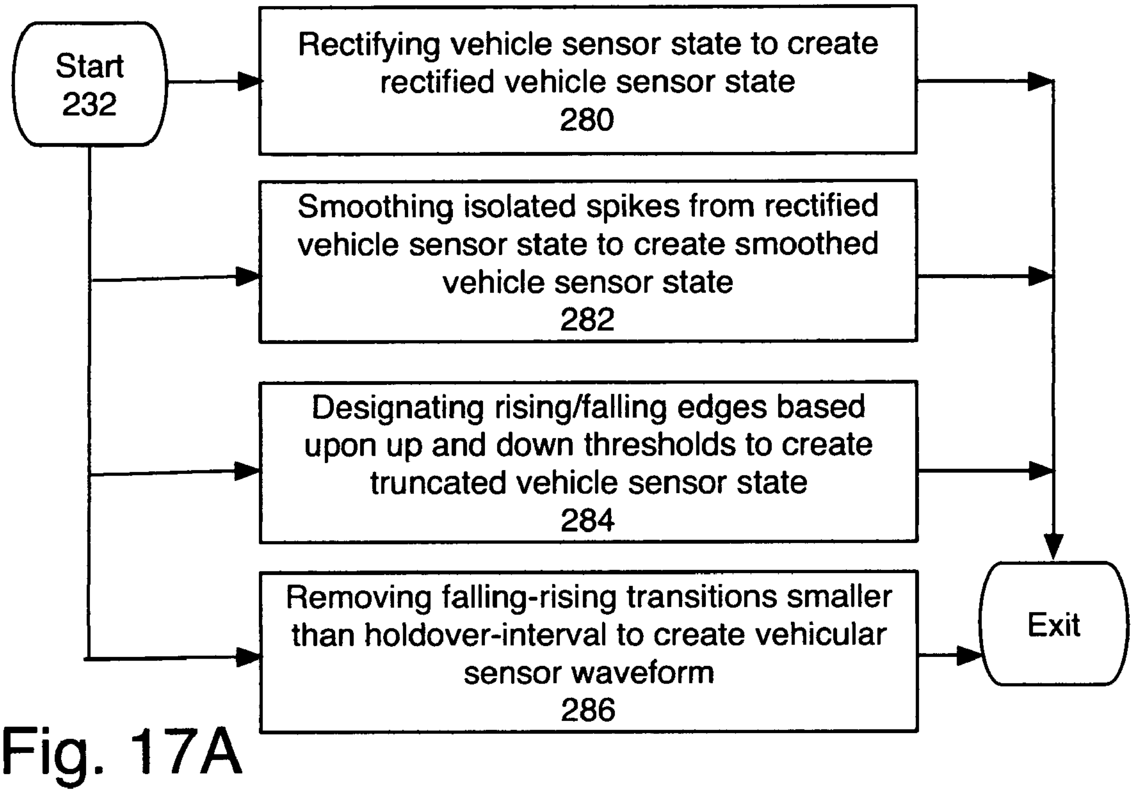

The invention includes the vehicle sensor state 104, shown in FIG. 17A as details of operation 232 of FIG. 16B, deriving the vehicular sensor waveform 106 from the vehicle sensor state queue 122. Operation 280 supports rectifying the vehicle sensor state 104 of FIG. 11A to create the rectified vehicle sensor state 202 of FIG. 1B. Operation 282 supports smoothing an isolated spike 160 in the rectified vehicle sensor state creates the smoothed vehicle sensor state 172 of FIG. 12A. Operation 284 supports designating rising edges and falling edges of the smoothed vehicle sensor state 172 based upon the up-threshold 184 and the down-threshold 186 of FIG. 14 to create the truncated vehicle sensor state 185 of FIG. 12B. And operation 286 supports removing falling-rising transitions smaller than the holdover-interval 138 in the truncated vehicle sensor state to create a preferred embodiment of the vehicular sensor waveform 106 shown in FIG. 12C.

This method of signal conditioning may or may not use additional memory to perform its operations. It removes false positives caused by the isolated spike 160. It also removes false positives caused by the vehicle sensor state 104 varying in sign while one vehicle passes near the magnetic sensor 2.

The up-threshold 184 is often preferred to be larger than the down-threshold 136. The up-threshold is preferred to be about 40 milli-gauss. The down-threshold is preferred to be about 22 milli-gauss. These values for the up-threshold and the down-threshold are typical for North America, and may be calibrated differently elsewhere. The holdover-interval 138 is often preferred between 10 milliseconds (ms) and 300 ms. The units of the up-threshold and down-threshold are in the units of the magnetic sensor 2. The units of the holdover-interval are preferably in terms of time steps of a time division multiplexing scheme controlled by synchronization with the access point 1500 preferably acting to synchronize each wireless vehicular sensor node 500 in the wireless vehicular sensor network 2300. Often these units may be preferred to be in terms of 1⁄1024 of a second, or roughly 1 ms.

FIG. 13 shows the wireless vehicular sensor node 500 including the following. Means for using 1000 a vehicle sensor state 104 from a magnetic sensor 2 to create a vehicular sensor waveform 106 based upon the presence of the vehicle 6. And means for operating 140 a transmitter 22 to send the report 180 across at least one wireless physical transport 1510 to the access point 1500 included the wireless vehicular sensor network 2300, to approximate the vehicular sensor waveform 106 at the access point. The report may be sent directly to the access point 1500, or via an intermediate node 580. The intermediate node may act as a repeater and/or signal converter, and may or may not function as a vehicular sensor node. The report may be generated by the means for using 1000 in certain embodiments of the invention.

The wireless vehicular sensor node 500 may include the following. Means for maintaining 300 a clock count 36, a task trigger 38, and a task identifier 34. Means for controlling a power source, may preferably distribute electrical power to the means for using 1000 and the means for operating 140, based upon the task trigger and the task identifier. The means for using may be provided operating power, when the magnetic sensor 2 is used to create the vehicular sensor waveform and/or to create its waveform characteristic 120 and/or its second waveform characteristic 120-2. These may then be preferably used to generate the report 180. The means for operating 140 may be provided operating power, when the report is to be sent to the access point 1500 across at least one wireless physical transport 1510, either directly, or via the intermediate node 580.

The wireless vehicular sensor node 500 may further preferably include: means for maintaining the clock count to create the task trigger and the task identifier. The means for operating 140 the transceiver 20 and means for using 1000 are directed by the task identifier 34, when the task trigger 38 is active. One or more computers, field programmable logic devices, and/or finite state machines may be included to implement these means.

FIG. 14 shows an alternative, often-preferred refinement, of the wireless vehicular sensor node 500 of FIG. 13. The means for controlling the power source provides a computer power to a node computer 10-N, a memory power to a node memory 14-N node accessibly coupled 14-N to the node computer. The means for controlling also provides a vehicle sensor power to the magnetic sensor 2 and a transceiver power to the transceiver 20, which preferably includes the transmitter 22 of FIG. 13. The node computer 10-N is first communicatively coupled 12 to the magnetic sensor 2, and is second communicatively coupled 16 to the transceiver. In certain further preferred embodiments, the node computer and a clock timer implementing the means for maintaining 300 may be housed in a single integrated circuit. In certain embodiments, the means for maintaining may be referred to as a clock timer.

Figure 17B:
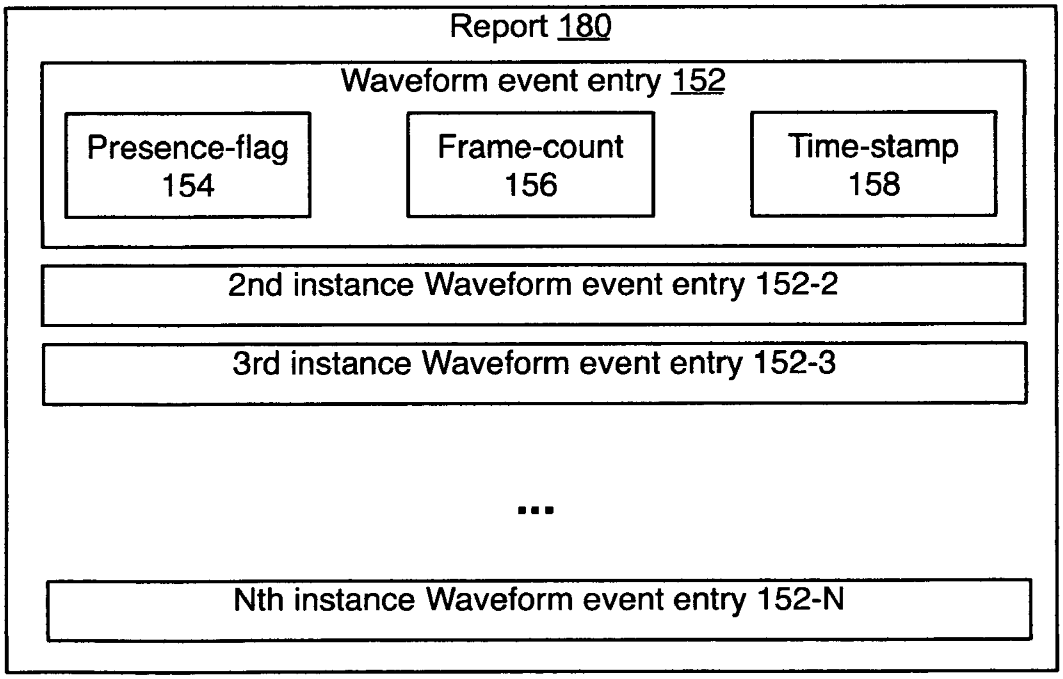
FIG. 17B shows an example of the report used in traffic monitoring activities.
Figure 21A:
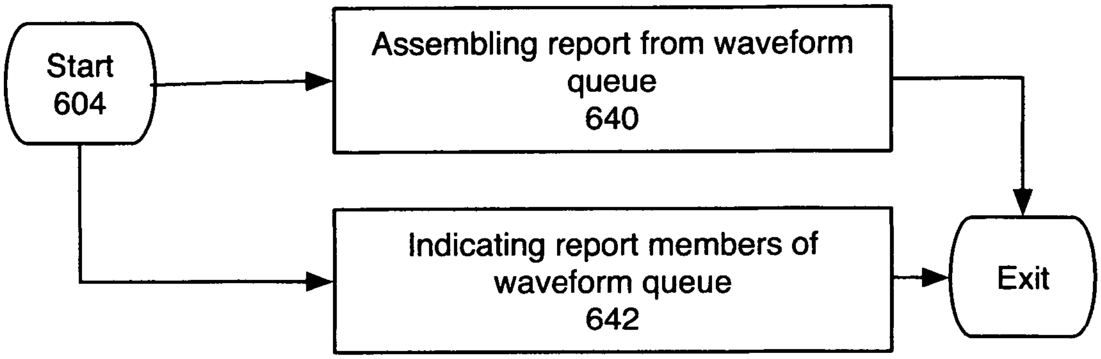
Figure 21B:
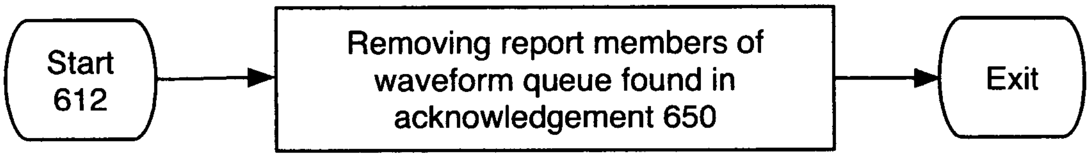
Figure 21C:
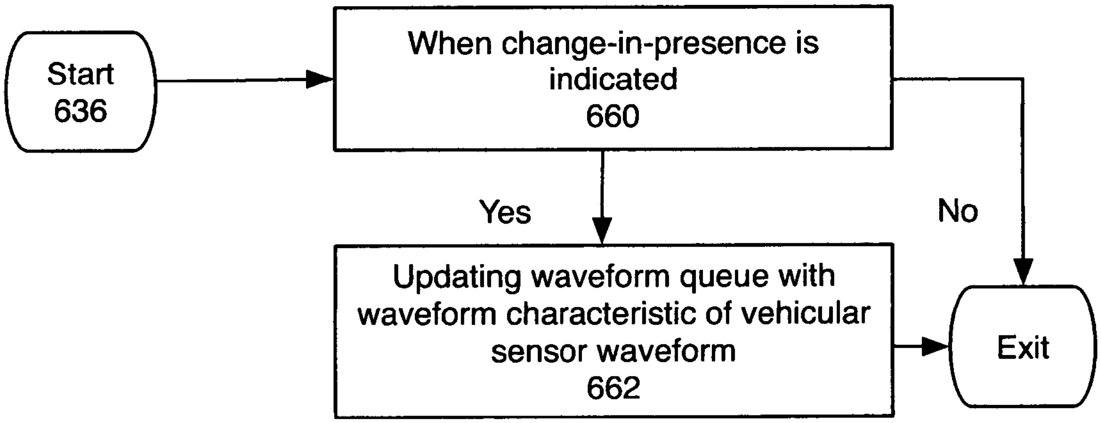
Figure 22A:
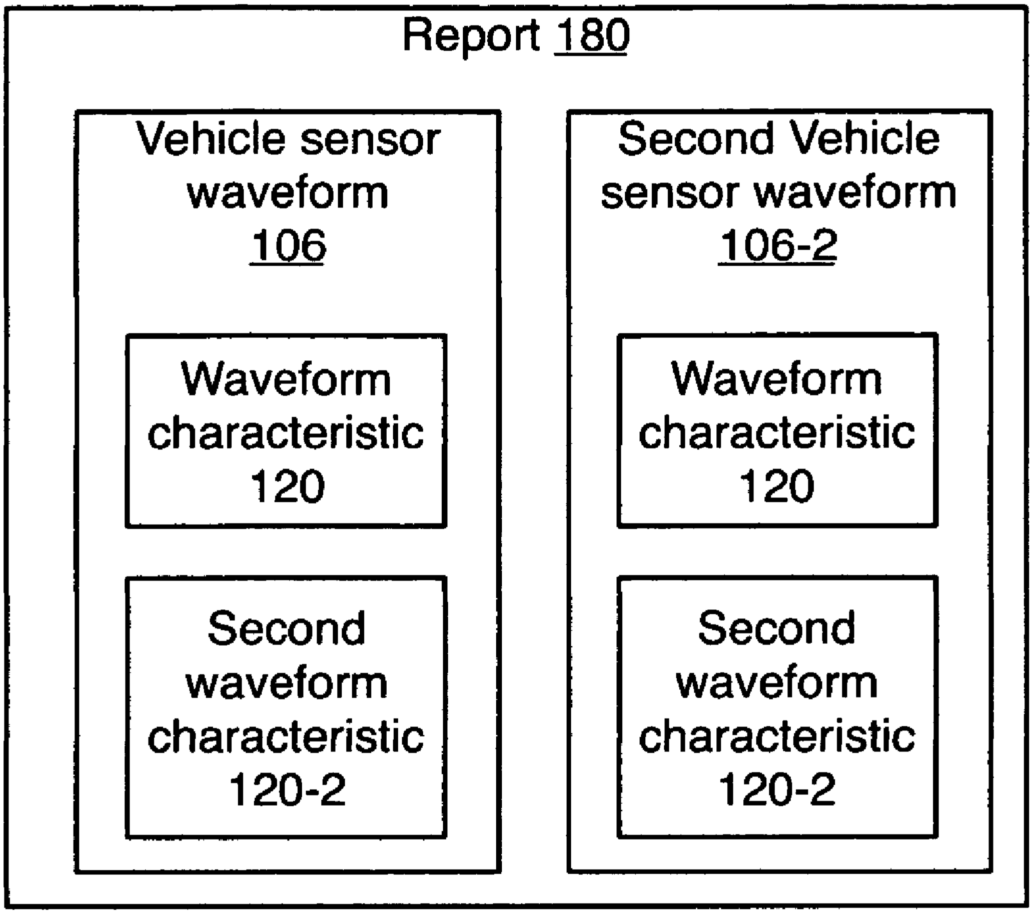
FIGS. 22A and 22B show a simplified version of the report for traffic monitoring operations, and its acknowledgement.

FIGS. 21A to 21C show aspects of the invention's method of responding to the presence of a motor vehicle in terms of the program system 200 of FIG. 14 to generate and transmit the report 180 of FIG. 22A and preferably, of FIG. 17B.

Figure 20A:
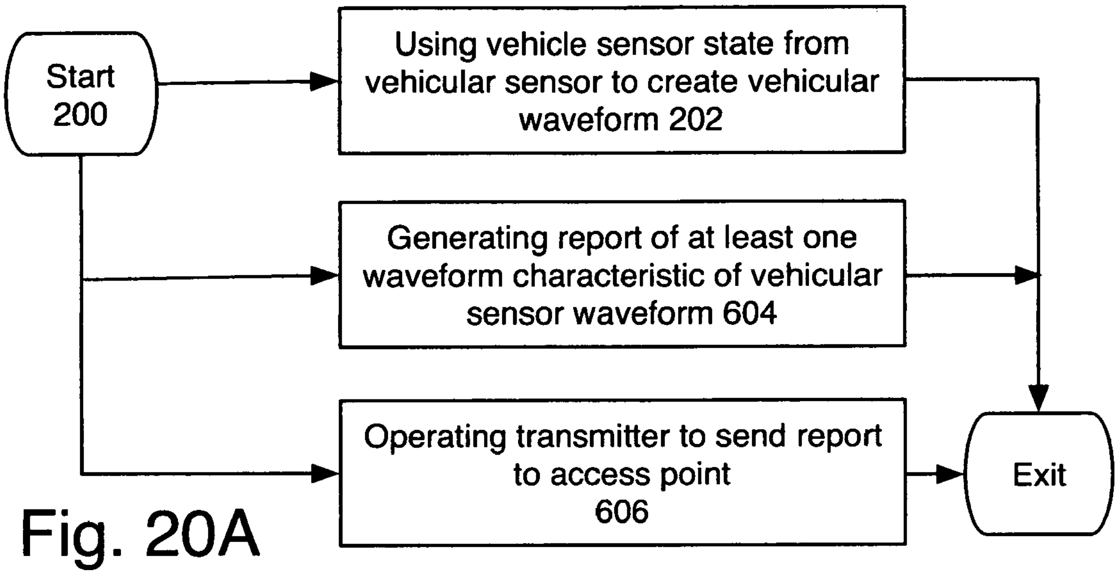
FIGS. 20A to 21C show some details of operating a wireless vehicular sensor node for traffic monitoring operations.

The program system 200 of FIG. 14 includes the program steps shown in FIG. 20A: Operation 202 supports using a vehicle sensor state 104 from a magnetic sensor 2 to create a vehicular sensor waveform 106 based upon the presence of the vehicle 6. Operation 604 supports generating a report 180 of at least one waveform characteristic 120 of the vehicular sensor waveform 106. Operation 606 supports operating a transmitter 22 to send the report 180 across at least one wireless physical transport 1510 to an access point 1500 included the wireless vehicular sensor network 2300, to approximate the vehicular sensor waveform at the access point.

Figure 20B:
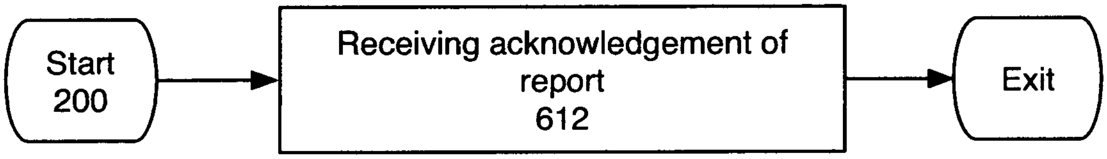
Figure 20C:
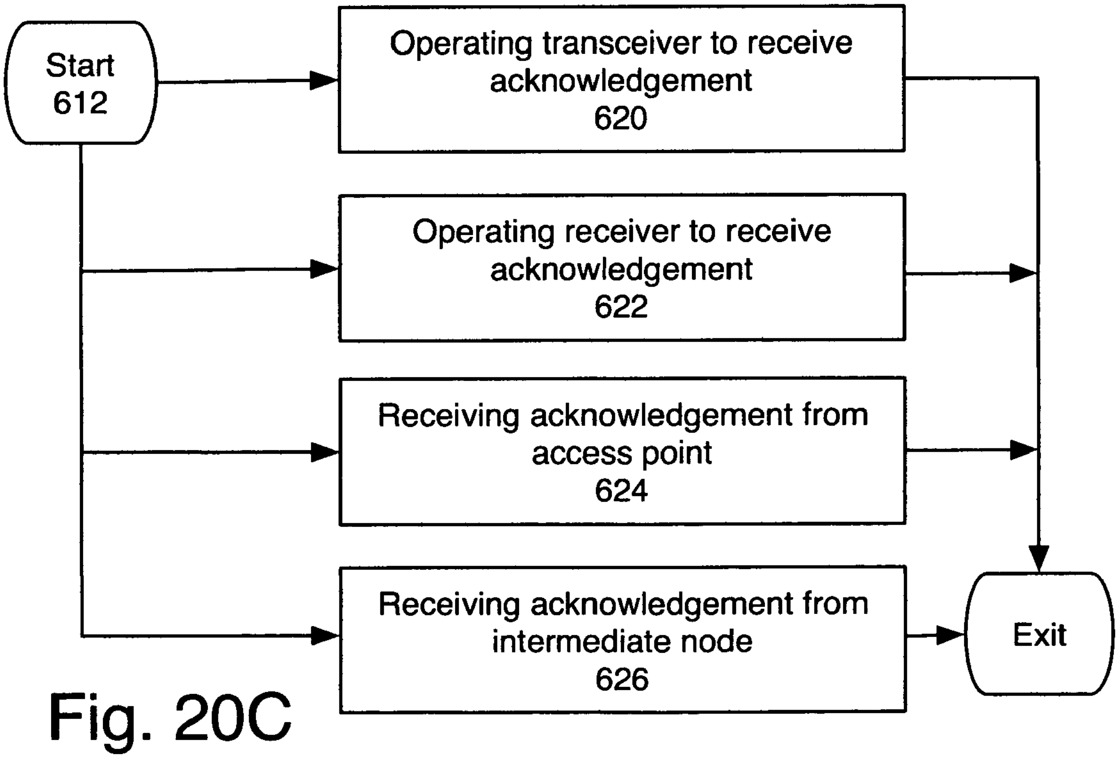
Figure 22B:
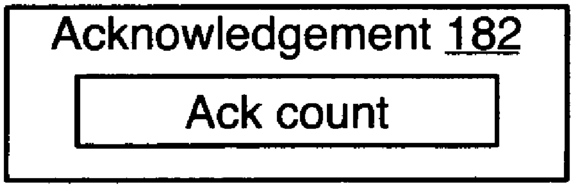

The program system 200 of FIG. 14 and FIG. 20A may further support operation 212 receiving an acknowledgement 182, as shown in FIG. 22B, of the report 180 in FIGS. 22B and 17B. The operation 612 of FIG. 20B may further include at least one of the following operations of FIG. 20C. Operation 620 supports operating the transceiver 20 to receive the acknowledgement 182. Operation 622 supports operating a receiver to receive the acknowledgement. Operation 624 supports receiving the acknowledgement from the access point 1500. Operation 626 supports receiving the acknowledgement from the intermediate node 580.

By way of example, suppose a vehicle 6 approaches the wireless vehicular sensor node 500. The vehicular sensor state 104 is used to update the vehicle sensor state queue 122, as supported by operation 230 of FIG. 16B. The vehicular sensor waveform 106 is derived from the vehicle sensor state queue, as supported by operation 232 and discussed regarding FIG. 10A to FIG. 10C, and FIG. 11A to FIG. 12C. A change-in-presence 126 of the vehicle is determined based the vehicular sensor waveform, as supported by operation 234. Usually this would be determined by a rising edge 108 in the vehicular sensor waveform. The waveform queue 124 is updated with a waveform characteristic 120, when the change-in-presence is indicated. Preferably, this waveform characteristic would indicate the rising edge.

To continue the example, suppose the vehicle 6 moves away from wireless vehicular sensor node 500 at a later time. The operations of FIG. 16B would support using the vehicle sensor state 104 in much the same way. The change-in-presence 126 of the vehicle is determined based the vehicular sensor waveform 106, as supported by operation 234, and would preferably be determined by a falling edge 110 in the vehicular sensor waveform. The waveform queue 124 is updated with a waveform characteristic 120, when the change-in-presence is indicated. Preferably, this waveform characteristic would indicate the falling edge.

The operation 604 of FIG. 20A, generating the report 180, may further include the operations of FIG. 21A. Operation 640 supports assembling the report from the waveform queue 124. Operation 642 supports indicating report members of the waveform queue.

The operation 612 of FIG. 20A, receiving the acknowledgement 182, may further include the operation of FIG. 21B. Operation 650 supports removing report members of the waveform queue 124 found in the acknowledgement.

The operation 636 of FIG. 16B may include the operations of FIG. 21C. Operation 660 supports determining when the change-in-presence 126 is indicated. When this is "No", the operations of this flowchart terminate. When "Yes", the operation 662 supports update the waveform queue 124 with at least one waveform characteristic 120 of the vehicular sensor waveform 106.

The wireless vehicular sensor node 500 includes a magnetic sensor 2, preferably having a primary sensing axis 4 for sensing the presence of a vehicle 6, as shown in FIG. 14, and used to create the vehicle sensor state 114. The magnetic sensor may preferably employ a magneto-resistive effect and preferably includes a more than one axis magneto-resistive sensor to create a vehicle sensor state.

By way of example, the magnetic sensor 2 may include a two axis magneto-resistive sensor. A two axis magneto-resistive sensor may be used to create the vehicle sensor state as follows. The X-axis may be used to determine motion in the primary sensor axis 4. The Z-axis may be used to determine the presence or absence of a vehicle 6.

Another example, the magnetic sensor 2 may further preferably include a three axis magneto-resistive sensor. A three axis magneto-resistive sensor may be used to create the vehicle sensor state as follows. The X-axis may also be used to determine motion in a primary sensor axis 4. The Y-axis and Z-axis may be used to determine the presence or absence of a vehicle 6. In certain embodiments, the Euclidean distance in the Y-Z plane is compared to a threshold value, if greater, then the vehicle is present, otherwise, absent. The vehicular sensor may preferably include one of the magneto-resistive sensors manufactured by Honeywell.

Transmitting the report 180 and/or the long report 190 uses at least one wireless physical transport. The wireless physical transport may include any of an ultrasonic physical transport, a radio-frequency physical transport, and/or an infrared physical transport. Transmitting reports may be spread across a frequency band of the wireless physical transport. More particularly, the transmitting of reports may include a chirp and/or a spread spectrum burst across the frequency band.

The transmitter 22 of FIG. 13, and the transceiver 20 of FIG. 14 may communicate across a wireless physical transport 1510, which may include any combination of an ultrasonic physical transport, a radio physical transport, and an infrared physical transport. Different embodiments of the wireless vehicular sensor node 500 may use difference combinations of these transmitters and/or transceivers. Where useful, the wireless vehicular sensor node includes an antenna 28 coupling with the transceiver 20 as shown, or to a transmitter, which is not shown. The antenna may preferably be a patch antenna.

The report 180 and/or the long report 190 may further identify the wireless vehicular sensor node 500 originating the report. Transmitting the report may initiate a response across the wireless physical transport, preferably from an access point. The response may be an acknowledgement 182 of receiving the report.

FIG. 22A shows an example of the report 180 generated and sent by the wireless vehicular sensor node 500 of FIGS. 13 and 14. The report may include at least one waveform characteristic 120 of at least one vehicular sensor waveform 106 indicating a change in the presence of a vehicle 6 passing near the wireless vehicular sensor node. In certain embodiments, multiple waveform characteristics may be included in the report for at least one vehicular sensor waveform. Multiple vehicular sensor waveforms may be included in the report, each with at least one waveform characteristic. More than one vehicular sensor waveforms included in the report may include more than one waveform characteristic.

Consider the following example of a wireless vehicular sensor network 2300 including an access point 1500 and multiple wireless vehicular sensor nodes as shown in FIGS. 4, 8A, and 13. One preferred embodiment of this network includes using a synchronous time division multiple access protocol based upon the IEEE 802.15.4 communications protocol. The access point transmits a synchronization message, which is received by the wireless vehicular sensor nodes, and permits them to synchronize on a system clock. Preferably, a wireless vehicular sensor node 500 includes a means for maintaining 300 a clock count 36, task trigger 38, and task identifier 34, as shown in FIG. 14.

By way of example, the time division multiple access protocol may synchronize the wireless vehicular sensor network 2300 to operate based upon a frame with a frame time period. The frame time period may preferably approximate at least one second. The time division multiple access protocol may operate in terms of time slots with a time slot period. The time slot period may be preferred to be a fraction of the frame time period. The fraction may preferably be a power of two. The power of two may preferably be one over 1K, which refers to the number 1,024. The time slot period then approximates a millisecond. The wireless vehicular sensor network may further organize the report 180 in terms of a meta-frame, which may preferably have a meta-frame time period as a multiple of the frame time period. The meta-frame time period may preferably be thirty times the frame time period, representing a half of a minute.

The report 180 may preferably include a waveform event list 150 for the waveform characteristics observed by the wireless vehicular sensor node 500 during the current and/or most recent meta-frame as shown in FIG. 17B. A waveform characteristic 120 may be represented in the waveform event list by a waveform event entry 152 including the following. A presence-flag 154 indicating the presence or absence of the vehicle 6. A frame-count 156 indicating the frame in the meta-frame, and a time-stamp 158 indicating the time slot within that frame in which the waveform characteristic occurred.

The waveform event list 150 may include a fixed number N of instances of the waveform event entry 152, to minimize computing and power consumption at the wireless vehicular sensor node 500. The fixed number N may be a power of two, such as 32 or 64.

The presence-flag 154 may represent a vehicle 6 being present with the binary value ‘1’, and the absence of the vehicle with a ‘0’. Alternatively, ‘0’ may represent the presence of the vehicle. And its absence by ‘1’.

The frame-count 156 may be represented in a five bit field. The time-stamp 158 may be represented in a ten bit field.

The waveform event entry may be considered as a fixed point number, preferably 16 bits. When the waveform event entry has one of the values of 0x7FFF or 0xFFFF, it represents a non-event, no additional waveform characteristic 120 has been determined by the wireless vehicular sensor node.

The access point 1500 may be a base station 1500 communicating with at least one of the first wireless vehicular sensor node 500-1 and the second wireless vehicular sensor node 500-1.

Returning to discuss organization of the traffic monitoring activities and their relationship with this invention, FIG. 3A shows an example with the first magnetic sensor 2-1 and the second magnetic sensor 2-2 included in a first traffic flow zone 2000-1.

FIGS. 3B and 4 shows other examples with a traffic monitor zone 2200 superimposed of the wireless vehicular sensor network 2300, but the first magnetic sensor 2-1 monitoring the first vehicle 6-1 in the first traffic flow zone 2000-1, and the second magnetic sensor 2-2 monitors a second vehicle 6-2 in a second traffic flow zone 2000-2.

FIG. 5 shows another example with a traffic monitor zone 2200 superimposed of the wireless vehicular sensor network 2300, which includes the first magnetic sensor 2-1 monitoring the first vehicle 6-1 in the first traffic flow zone, but does not include the second magnetic sensor 2-2 monitoring the second vehicle 6-2 in the second traffic flow zone 2000-2.

FIG. 6 shows another example with a first traffic monitor zone 2200-1 superimposed of the first wireless vehicular sensor network 2300-1, which includes the first magnetic sensor 2-1 monitoring the first vehicle 6-1 in the first traffic flow zone. A second traffic monitor zone 2200-1 is superimposed on the second wireless vehicular sensor network 2300-2, which includes the second magnetic sensor 2-2 monitoring the second vehicle 6-2 in the second traffic flow zone 2000-2.

The preceding embodiments provide examples of the invention and are not meant to constrain the scope of the following claims.

What is claimed is:

1. A method, comprising the step of using a first wireless vehicular sensor node and a second wireless vehicular sensor node, each using a time synchronization message, comprising the step of:

wirelessly receiving a first vehicular waveform report from said first wireless vehicular sensor node time-interleaved based upon said time synchronization message with a second vehicular waveform report from said second wireless vehicular sensor node;

wherein said first vehicular waveform report approximates a first raw vehicular sensor waveform observed by a first magnetic sensor operated by said first wireless vehicular sensor node, said first magnetic sensor observing a first vehicle;

wherein said second vehicular waveform report approximates a second raw vehicular sensor waveform observed by a second magnetic sensor operated by said second wireless vehicular sensor node, said second magnetic sensor observing a second vehicle.

2. The method of claim 1, wherein said second vehicle is said first vehicle.

3. The method of claim 1, wherein said second vehicle is distinct from said first vehicle.

4. The method of claim 1, wherein at least one of said first wireless vehicular sensor node and said second wireless vehicular sensor node are included in a wireless vehicular sensor network.

5. The method of claim 4, wherein said wireless vehicular sensor network, includes:

each of said first wireless vehicular sensor node and said second wireless vehicular sensor node.

6. The method of claim 5, wherein said wireless vehicular sensor network, further includes:

an access point wirelessly communicating with said first wireless vehicular sensor node and with said second wireless vehicular sensor node.

7. The method of claim 6, wherein the step wirelessly receiving is comprised of the step:

wirelessly receiving via said access point said first vehicular waveform report from said first wireless vehicular sensor node time-interleaved with said second vehicular waveform report from said second wireless vehicular sensor node.

8. The method of claim 7, further comprising the step:

said first wireless sensor node and said second wireless sensor node both receiving said time synchronization message;

wherein said first raw vehicular sensor waveform observed at said first wireless vehicular sensor node is time synchronized with said second raw vehicular sensor waveform observed at said second wireless vehicular sensor node.

9. The method of claim 1, wherein the step of said first and second wireless nodes both receiving said time synchronization message, further comprises the step:

said first wireless sensor node and said second wireless sensor node both wirelessly receiving said time synchronization message.

10. The method of claim 9, further comprises the step:

said access point sending said time synchronization message to said first wireless sensor node and said second wireless sensor node.

11. The method of claim 1, wherein the step wirelessly receiving said first vehicular waveform report time-interleaved with said second vehicular waveform report, further comprises the step:

wirelessly receiving said first vehicular waveform report from said first wireless vehicular sensor node time-interleaved with said second vehicular waveform report from said second wireless vehicular sensor node, when said first vehicle is within a first distance of said first magnetic sensor, and when said second vehicle is within a second distance of said second magnetic sensor.

12. The method of claim 11, wherein said first distance is essentially the same as said second distance.

13. The method of claim 11, wherein said first distance is distinct from said second distance.

14. The method of claim 11, wherein both said first distance and said second distance are at most three meters.

15. The method of claim 1, wherein said first wireless vehicular sensor node includes said first magnetic sensor.

16. The method of claim 1, the step wirelessly receiving further comprises at least one of the steps of the group consisting of:

wirelessly receiving said first vehicular waveform report from said first wireless vehicular sensor node time-interleaved with a third vehicular waveform report from a third wireless vehicular sensor node;

wirelessly receiving said second vehicular waveform report from said second wireless vehicular sensor node time-interleaved with said third vehicular waveform report from said third wireless vehicular sensor node; and wirelessly receiving said first vehicular waveform report from said first wireless vehicular sensor node time-interleaved with said second vehicular waveform report from said second wireless vehicular sensor node, and time-interleaved with said third vehicular waveform report from said third wireless vehicular sensor node.

17. The first vehicular waveform report and the second vehicular waveform report as products of the process of claim 1.

18. An apparatus, comprising:

means for wirelessly receiving a first vehicular waveform report from a first wireless vehicular sensor node time-interleaved based upon a time synchronization message with a second vehicular waveform report from a second wireless vehicular sensor node, said first wireless vehicular sensor node operates a first magnetic sensor observing a first vehicle to create said first vehicular waveform report, said second wireless vehicular sensor node operates a second magnetic sensor observing a second vehicle to create said second vehicular waveform report, and both of said first vehicular sensor node and said second vehicular sensor node use said time synchronization message.

19. The apparatus of claim 18, further comprising:

a wireless vehicular sensor network, including:

said first wireless vehicular sensor node and said second wireless vehicular sensor node; and an access point wirelessly communicating with said first wireless vehicular sensor node and said second wireless vehicular sensor node.

20. The apparatus of claim 19, wherein the means for wirelessly receiving comprises:

means for wirelessly receiving via said access point said first vehicular waveform report from said first wireless vehicular sensor node time-interleaved with said second vehicular waveform report from said second wireless vehicular sensor node.

21. The apparatus of claim 20, wherein said first wireless sensor node and said second wireless sensor node both wirelessly receive said time synchronization message;

wherein said raw vehicular sensor waveform observed at said first wireless vehicular sensor node is time synchronized with said second raw vehicular sensor waveform observed at said second wireless vehicular sensor node.

22. The apparatus of claim 21, further comprises:

said access point sending said time synchronization message to said first wireless sensor node and said second wireless sensor node.

23. The apparatus of claim 22, wherein said wireless vehicular sensor network supports at least one wireless communications standard.

24. The apparatus of claim 23, wherein said wireless vehicular sensor network supports at least one member of the group consisting of:

a version of the IEEE 80215 communications standard;

a version of the Global System for Mobile (GSM) communications standard;

a version of the General Packet Radio Service (GPRS) communications standard;

a version of the IS-95 communications standard; and a version of the IEEE 80211 communications standard.

25. The apparatus of claim 20, wherein said access point supports a wireless communications protocol incorporating elements of a Code Division Multiple Access communications scheme.

26. The apparatus of claim 18, wherein said first wireless vehicular sensornode includes said first magnetic sensor.

27. The apparatus of claim 18, wherein said second wireless vehicular sensor node includes said second magnetic sensor.

28. The apparatus of claim 18, wherein said first wireless vehicular sensor node transmits said first vehicular waveform report when said first raw vehicular sensor waveform indicates said first vehicle is within said first distance; and wherein said second wireless vehicular sensor node transmits said second vehicular waveform report when said second raw vehicular sensor waveform indicates said second vehicle is within said second distance.

29. The apparatus of claim 18, wherein the means for wirelessly receiving may include at least one instance of at least one member of the group consisting of:

a computer wirelessly communicating with at least one of said first wireless vehicular sensor node, and said second wireless vehicular sensor node, and accessibly coupled to a memory including at least one program step included in a program system directing said computer to use said first wireless vehicular sensor node and said second wireless vehicular sensor node based upon said time synchronization message;

a finite state machine wirelessly communicating with at least one of said first wireless vehicular sensor node, and said second wireless vehicular sensor node;

an inferential engine wirelessly communicating with at least one of said first wireless vehicular sensor node, and said second wireless vehicular sensor node;

wherein wirelessly communicating with said first wireless vehicular sensor node, includes: communicating with said first wireless vehicular sensor node to wirelessly receive said first vehicular waveform report; and wherein wirelessly communicating with said second wireless vehicular sensor node, includes: communicating with said second wireless vehicular sensor node to wirelessly receive said second vehicular waveform report.

30. The apparatus of claim 29, wherein said computer communicating with said first wireless vehicular sensor node to wirelessly receive said first vehicular waveform report, further comprises:

said computer communicating via an access point with said first wireless vehicular sensor node to wirelessly receive said first vehicular waveform report;

wherein said computer communicating with said second wireless vehicular sensor node to wirelessly receive said second vehicular waveform report, further comprises:

said computer communicating via said access point with said second wireless vehicular sensor node to wirelessly receive said second vehicular waveform report;

wherein said finite state machine communicating with said first wireless vehicular sensor node to wirelessly receive said first vehicular waveform report, further comprises:

said finite state machine communicating via an access point with said first wireless vehicular sensor node to wirelessly receive said first vehicular waveform report;

wherein said finite state machine communicating with said second wireless vehicular sensor node to wirelessly receive said second vehicular waveform report, further comprises:

said finite state machine communicating via said access point with said second wireless vehicular sensor node to wirelessly receive said second vehicular waveform report;

wherein said inferential engine communicating with said first wireless vehicular sensor node to wirelessly receive said first vehicular waveform report, further comprises:

said inferential engine communicating via an access point with said first wireless vehicular sensor node to wirelessly receive said first vehicular waveform report; and wherein said inferential engine communicating with said second wireless vehicular sensor node to wirelessly receive said second vehicular waveform report, further comprises:

said inferential engine communicating via said access point with said second wireless vehicular sensor node to wirelessly receive said second vehicular waveform report.

31. The apparatus of claim 30, wherein said access point, includes said means for wirelessly receiving.

32. The apparatus of claim 30, wherein said access point is abase station communicating with at least one member of the group consisting of: said first wireless vehicular sensor node and said second wireless vehicular sensor node.

* * * * *